United States Patent
Nomura et al.

(10) Patent No.: US 9,602,386 B2
(45) Date of Patent: Mar. 21, 2017

(54) NODE APPARATUS, RECORD MEDIUM FOR STORING CONTROL PROGRAM, WIRELESS COMMUNICATION SYSTEM, AND METHOD FOR DATA COMMUNICATION

(71) Applicant: FUJITSU LIMITED, Kawasaki-shi, Kanagawa (JP)

(72) Inventors: Yayoi Nomura, Fukuoka (JP); Kazuaki Sumi, Fukuoka (JP); Yasuhiro Kurogi, Fukuoka (JP); Takayuki Okamasu, Fukuoka (JP); Tatsuya Soneda, Fukuoka (JP); Taiji Kondo, Chiba (JP)

(73) Assignee: FUJITSU LIMITED, Kawasaki (JP)

( * ) Notice: Subject to any disclaimer, the term of this patent is extended or adjusted under 35 U.S.C. 154(b) by 138 days.

(21) Appl. No.: 14/530,984

(22) Filed: Nov. 3, 2014

(65) Prior Publication Data
US 2015/0139030 A1  May 21, 2015

(30) Foreign Application Priority Data
Nov. 18, 2013 (JP) .................. 2013-238140

(51) Int. Cl.
*H04L 12/751* (2013.01)
*H04L 12/721* (2013.01)
*H04L 12/741* (2013.01)

(52) U.S. Cl.
CPC .............. *H04L 45/02* (2013.01); *H04L 45/72* (2013.01); *H04L 45/745* (2013.01)

(58) Field of Classification Search
CPC .......... H04L 45/36; H04L 45/54; H04L 45/02
See application file for complete search history.

(56) References Cited

U.S. PATENT DOCUMENTS

2012/0106552 A1*  5/2012  Iwao .................. H04L 45/36
370/392

FOREIGN PATENT DOCUMENTS

JP  2005-260299  9/2005
JP  2006-129381  5/2006
WO  2011013165  2/2011

OTHER PUBLICATIONS

Amaya Variable-length Address Routing for Mobile Ad Hoc Networks . Dec. 12, 2003.*

* cited by examiner

*Primary Examiner* — Yemane Mesfin
*Assistant Examiner* — Henry Baron
(74) *Attorney, Agent, or Firm* — Fujitsu Patent Center

(57) ABSTRACT

First node stores completion information on second node that is adjacent to the first node, the completion information indicating whether or not a route between a target destination and the second node has been constructed using an address with a specified size; acquire a first address with the specified size that specifies the first node, and transmits to adjacent nodes the completion information on the first node indicating that the route between the target destination and the first node has been constructed using an address with a specified size, when the completion information on the second node has indicated that the route between the target destination and the second node has been constructed using the address with the specified size and when the first address has been acquired; and transmits a data frame by using the first address, when the completion information on the first node is transmitted.

12 Claims, 44 Drawing Sheets

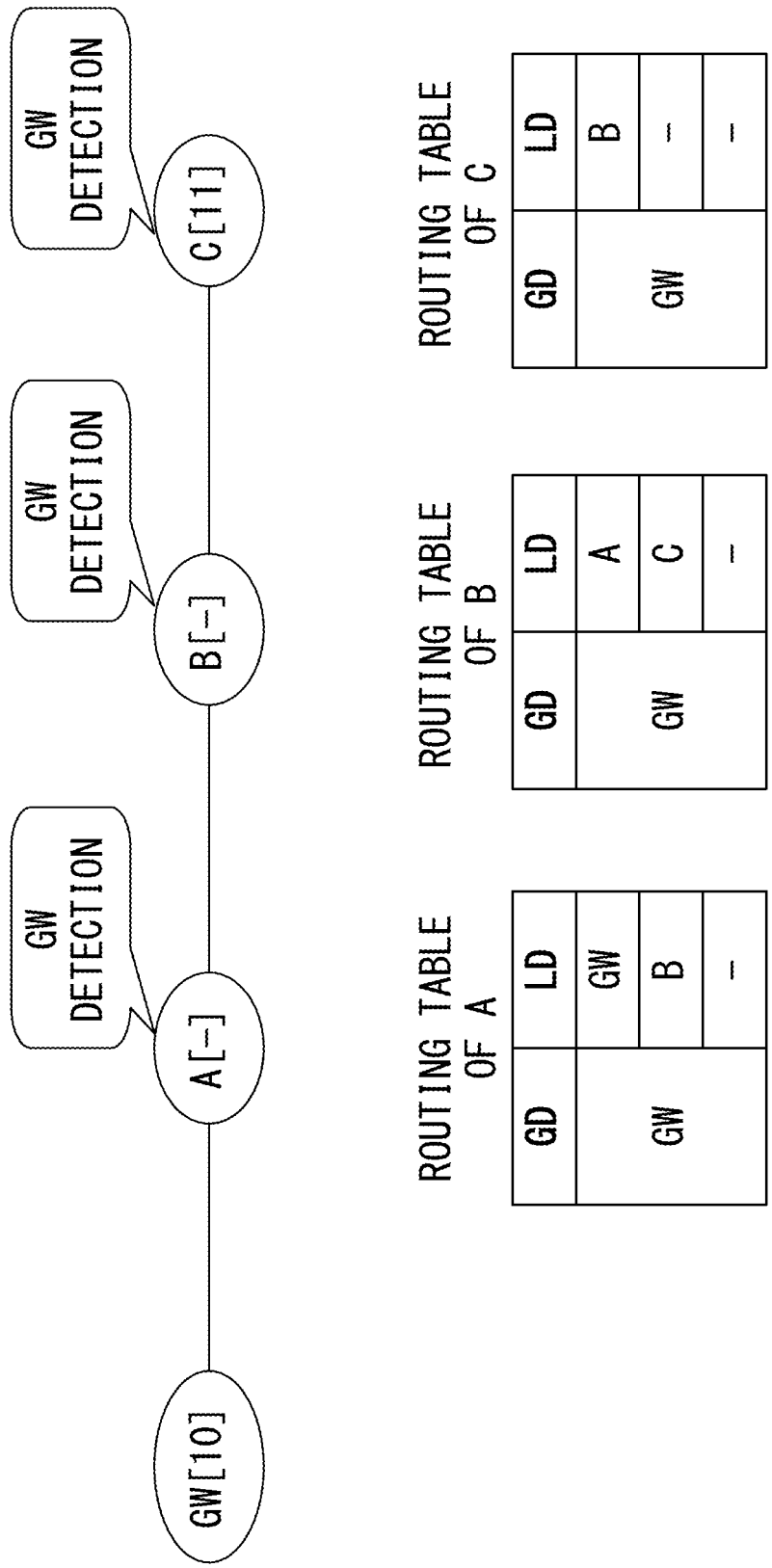
F I G. 1

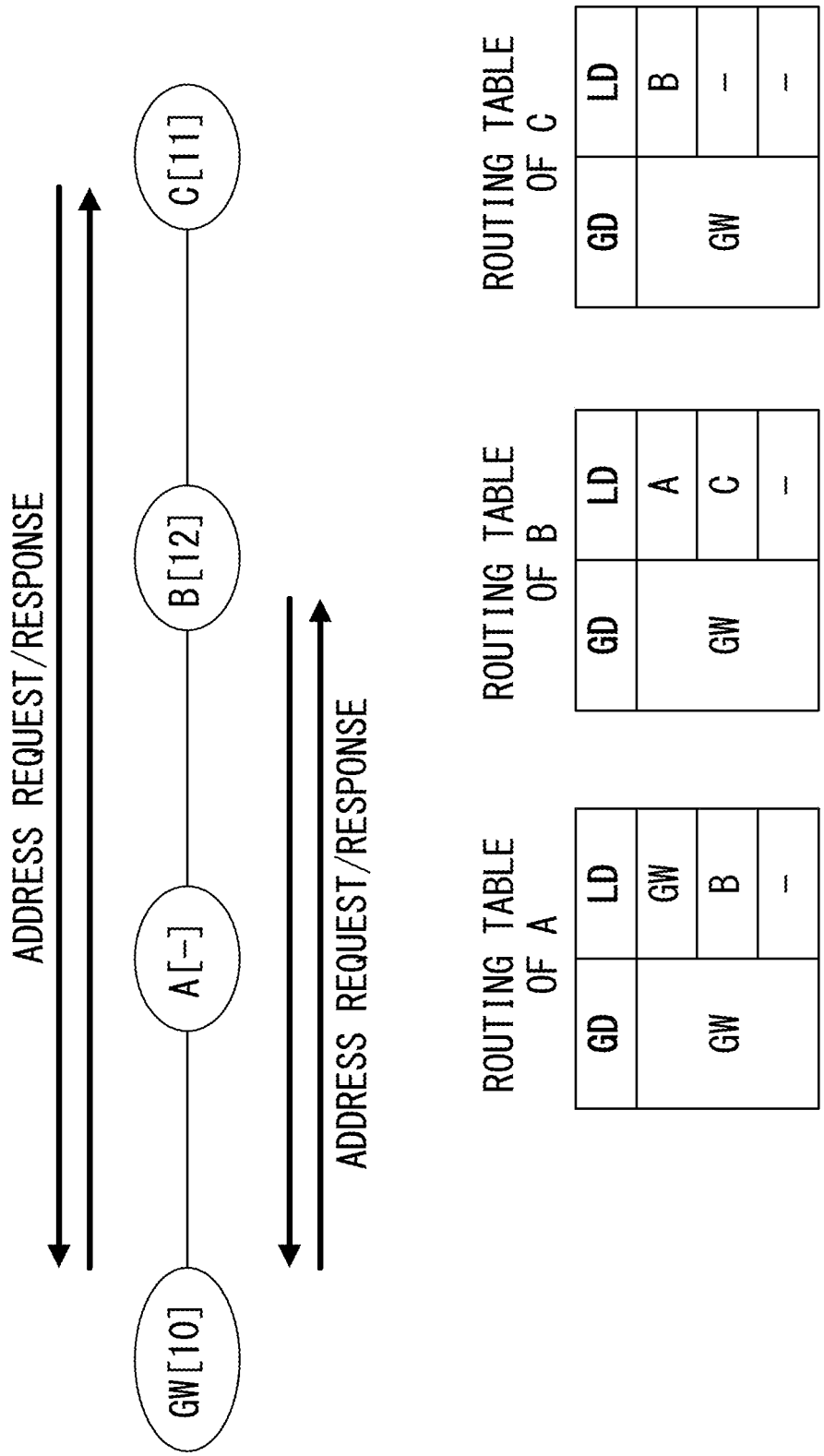
F I G. 2

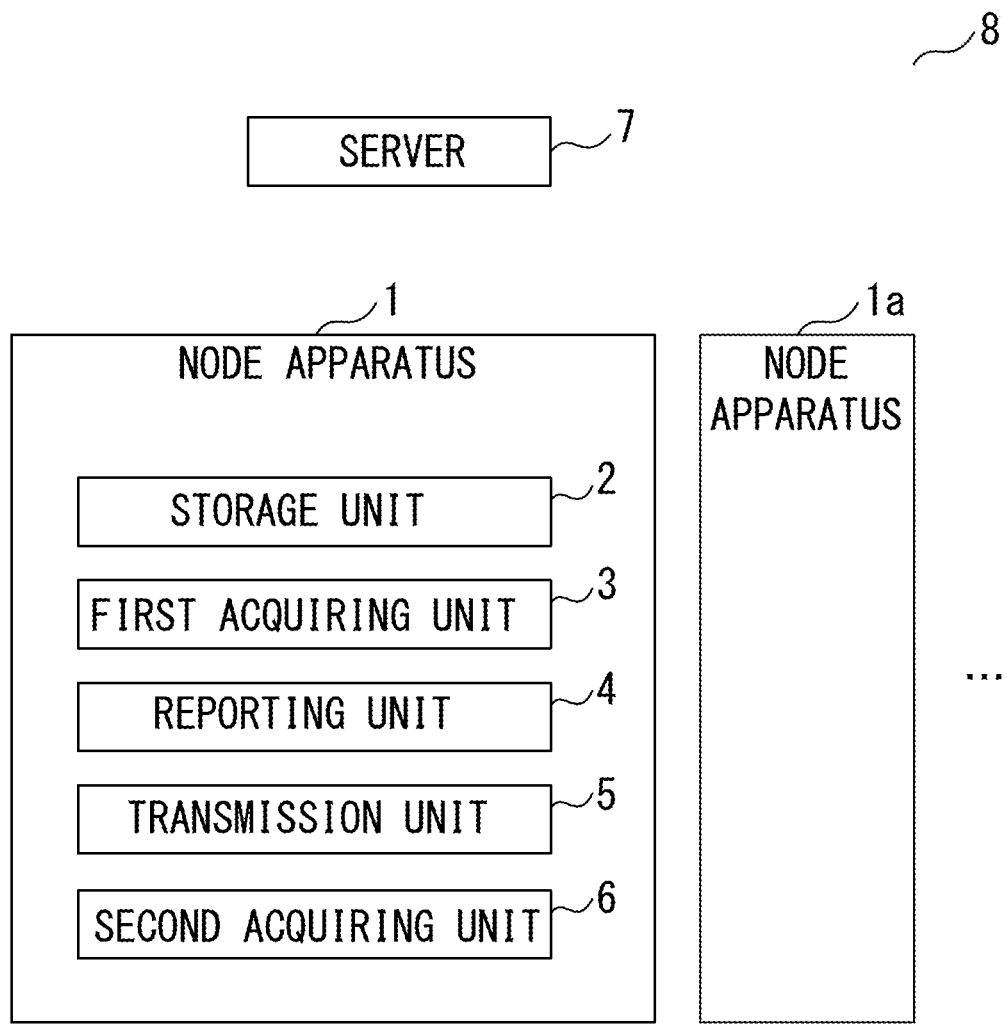
F I G. 5

| LD | LS | SHORT ADDRESS | GD | ROUTE CONSTRUCTION FLAG | ... |

F I G. 7

| GD | LD | ROUTE CONSTRUCTION FLAG | SHORT ADDRESS |
|---|---|---|---|
| GW | X | ON | 01 |
| | Y | OFF | 02 |
| | ... | ... | ... |

FIG. 9

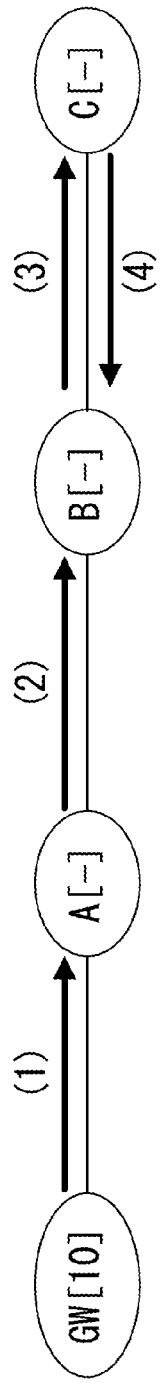

ROUTING TABLE OF A

| GD | LD | ROUTE CONSTRUCTION FLAG |
|---|---|---|
| GW | B | OFF⇒ON |
| | | OFF |
| – | – | – |

ROUTING TABLE OF B

| GD | LD | ROUTE CONSTRUCTION FLAG |
|---|---|---|
| GW | A | OFF |
| | C | OFF |
| – | – | – |

ROUTING TABLE OF C

| GD | LD | ROUTE CONSTRUCTION FLAG |
|---|---|---|
| GW | B | OFF |
| – | – | – |

※ IN PARENTHESIS [ ] INDICATES ALLOCATED 16 bit SHORT ADDRESS
[–] INDICATES STATE WITH NO SHORT ADDRESS (1) HELLO OF GW | LD:FF | LS:GW | SHORT ADDRESS: 10 | GD:GW | ROUTE CONSTRUCTION FLAG ON
(2) HELLO OF A | LD:FF | LS:A | SHORT ADDRESS: 0 | GD:GW | ROUTE CONSTRUCTION FLAG OFF
(3) HELLO OF B | LD:FF | LS:B | SHORT ADDRESS: 0 | GD:GW | ROUTE CONSTRUCTION FLAG OFF
(4) HELLO OF C | LD:FF | LS:C | SHORT ADDRESS: 0 | GD:GW | ROUTE CONSTRUCTION FLAG OFF

F I G. 1 2

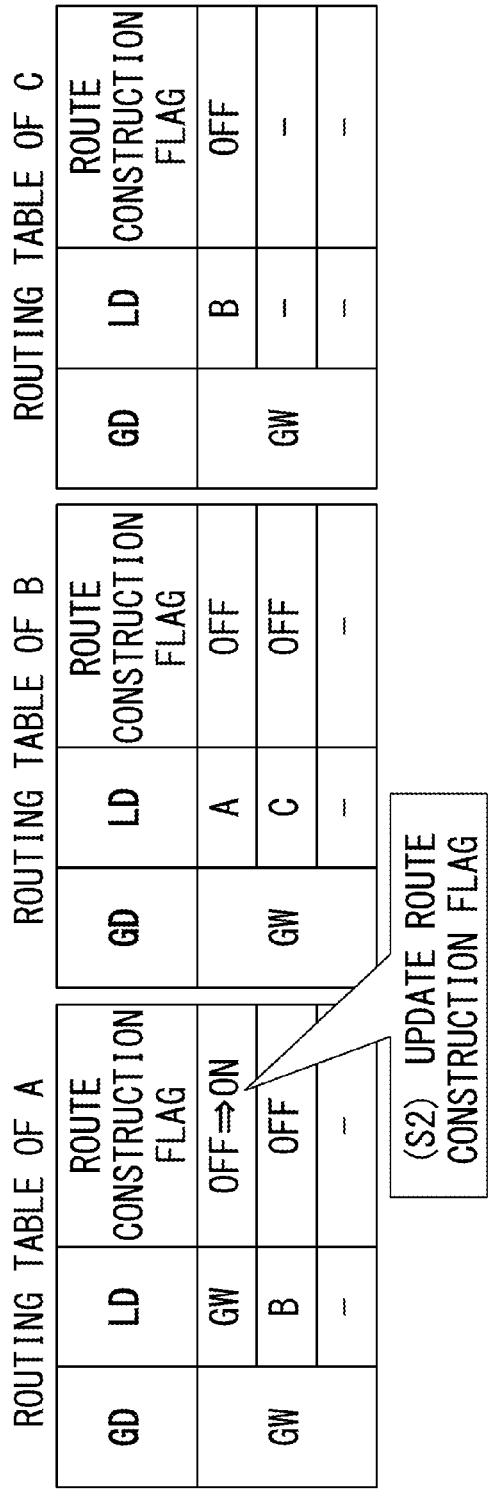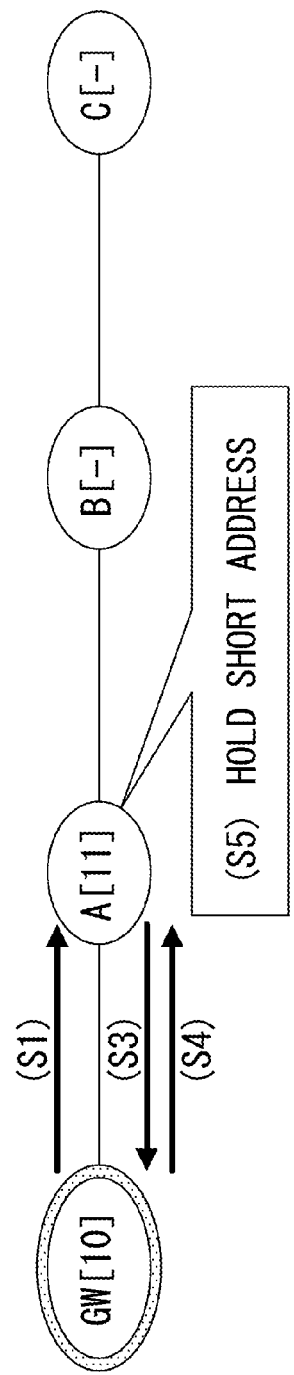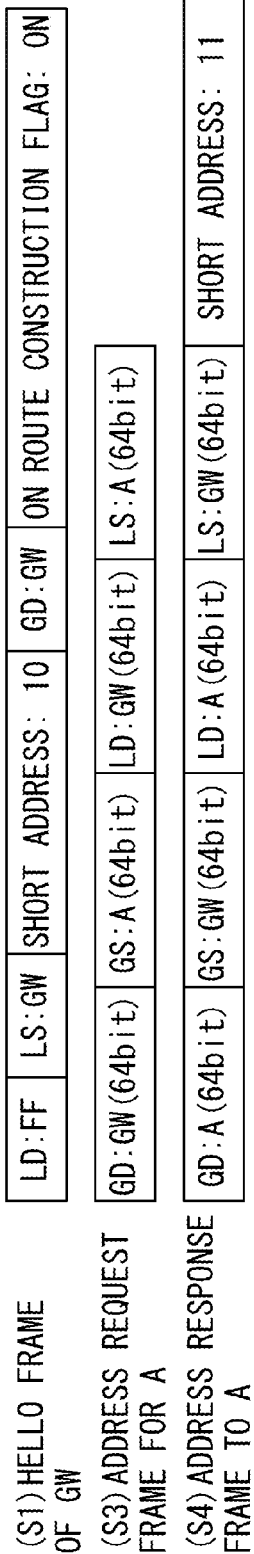
F I G. 2 0

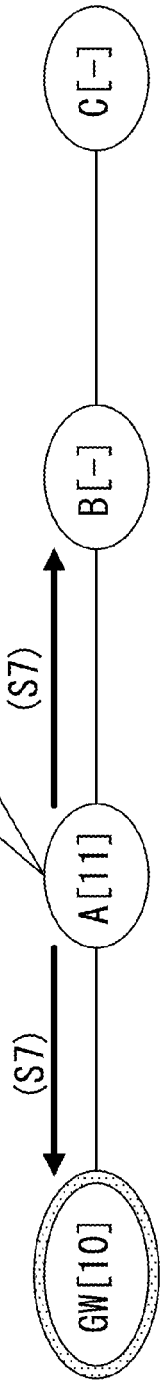
F I G. 21

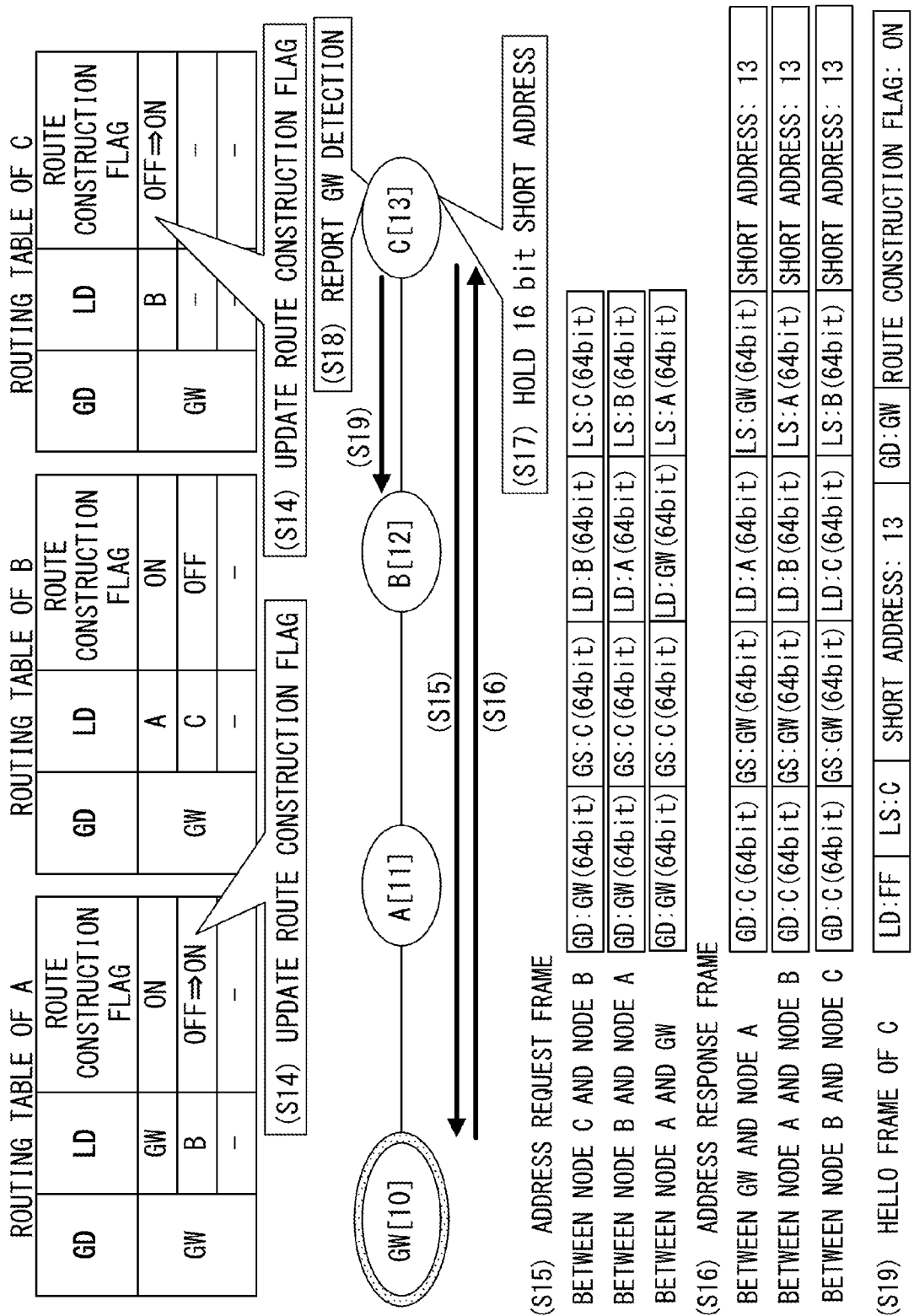
F I G. 23

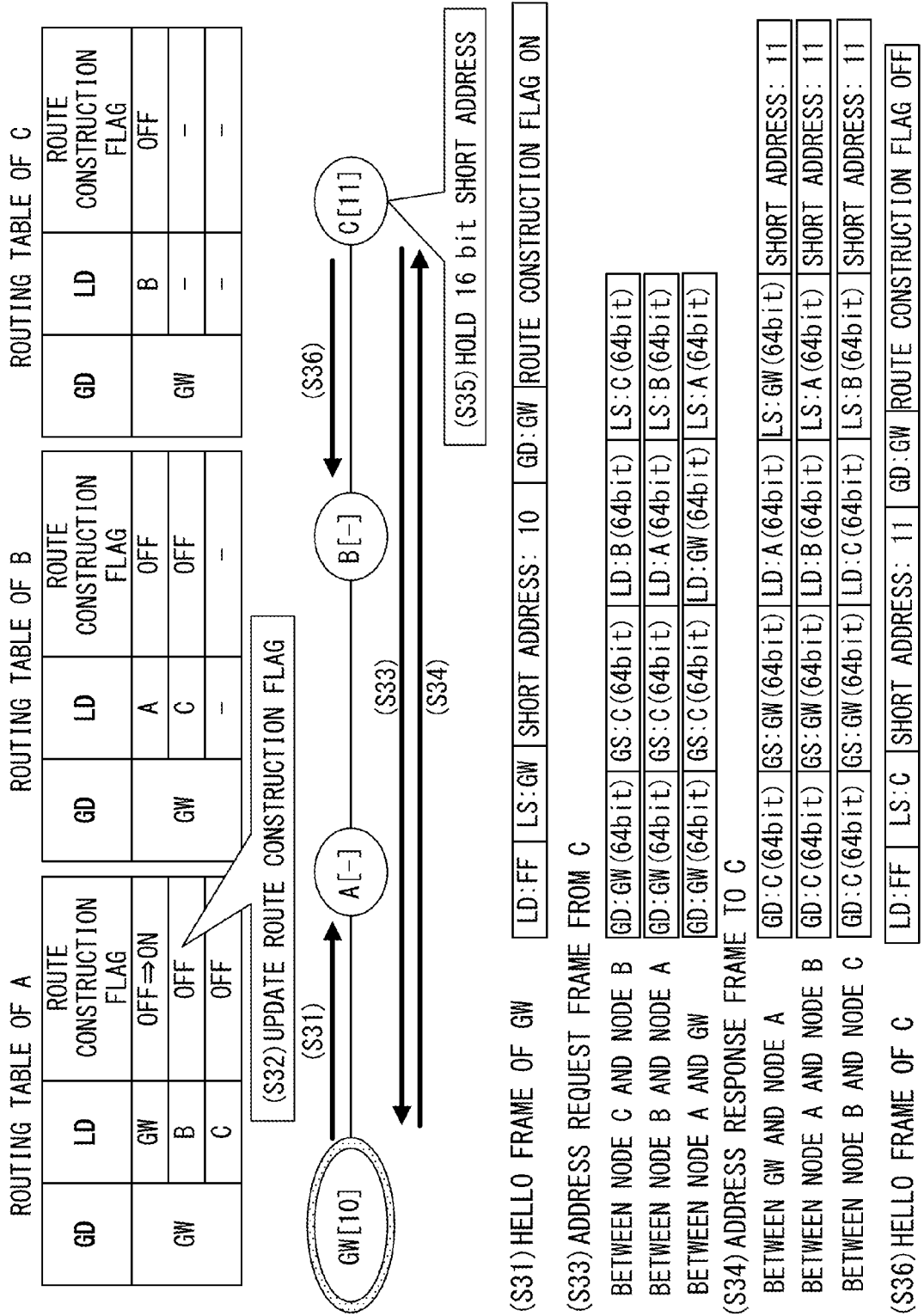
F I G. 2 6

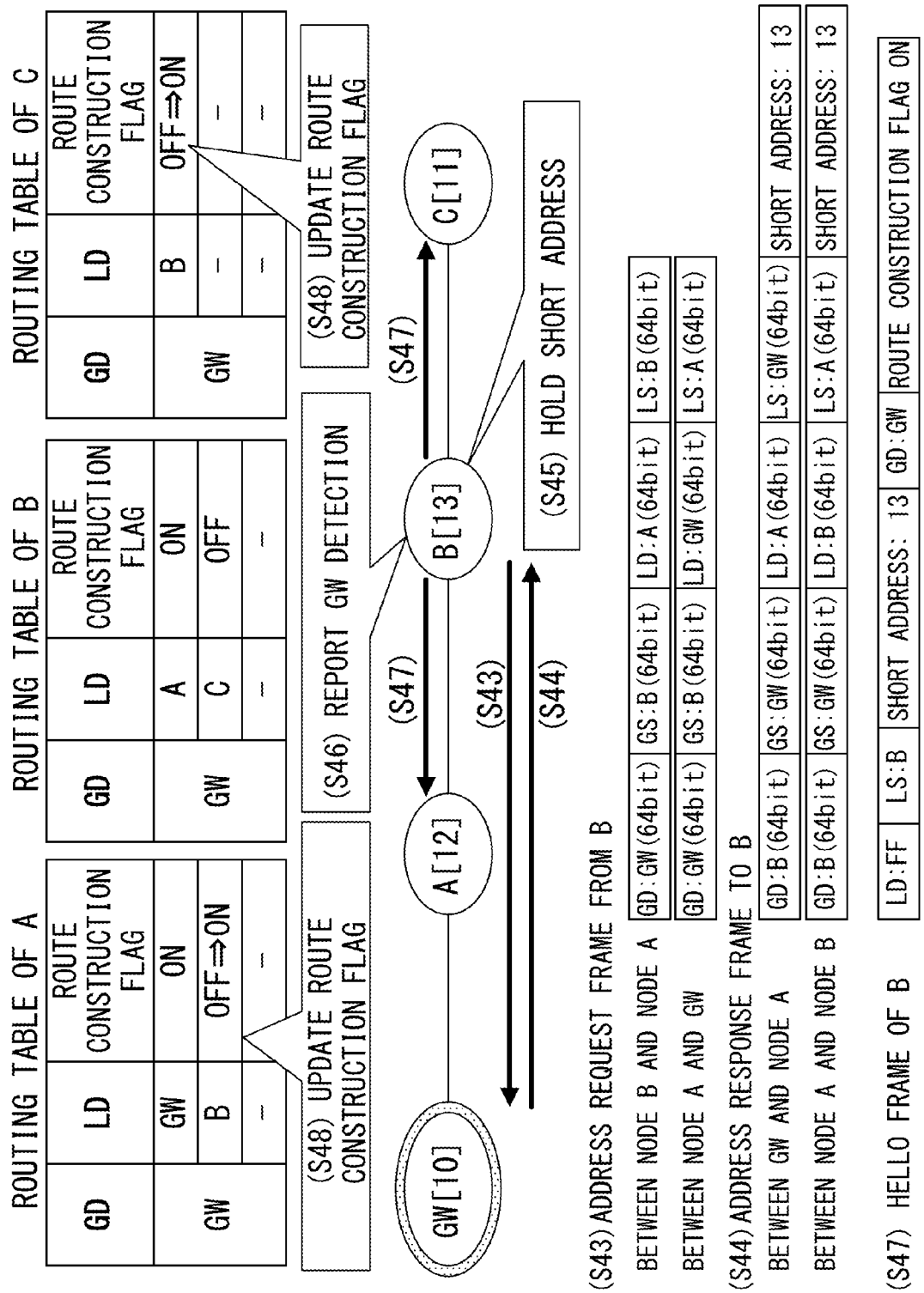
F I G. 28

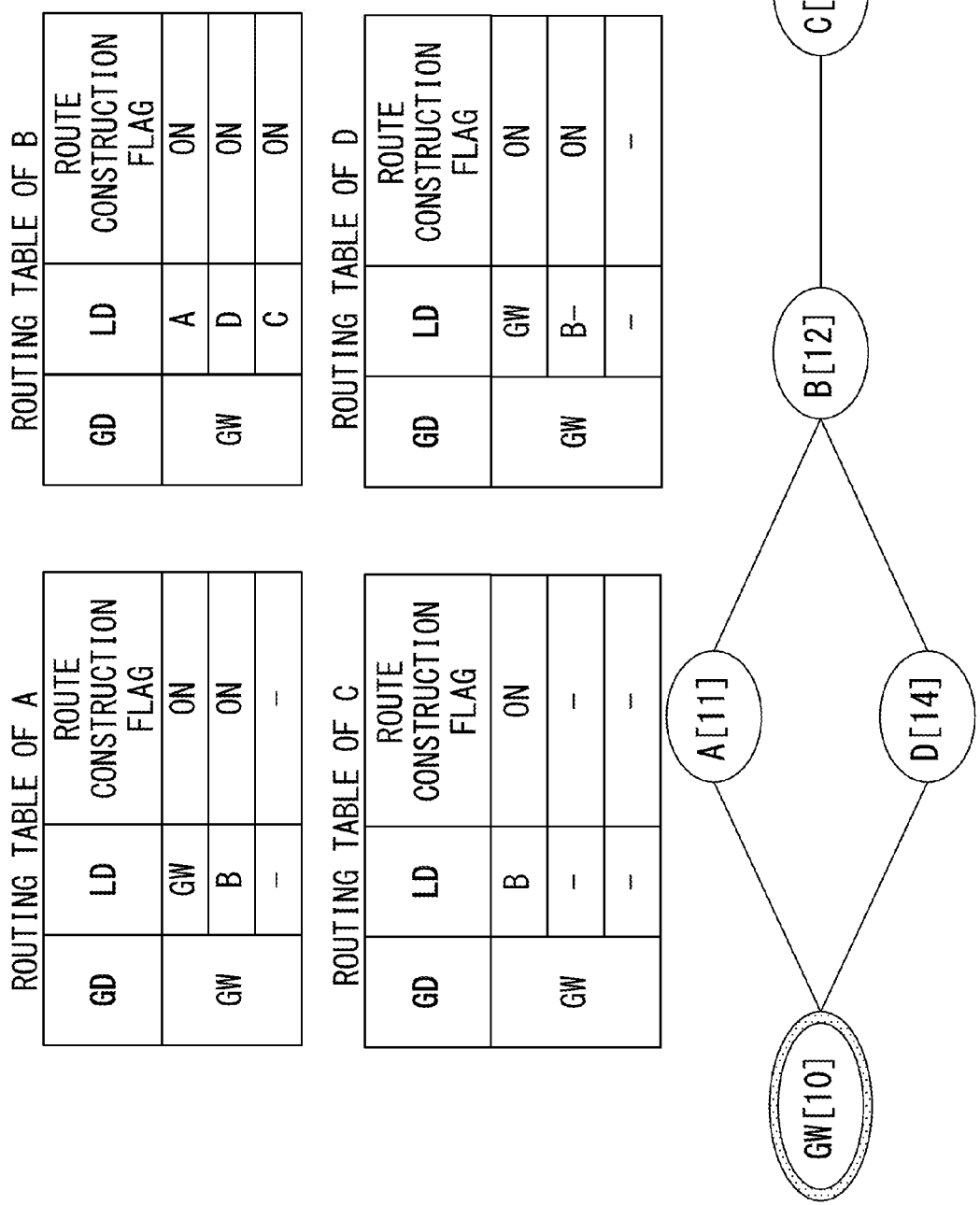
F I G. 31

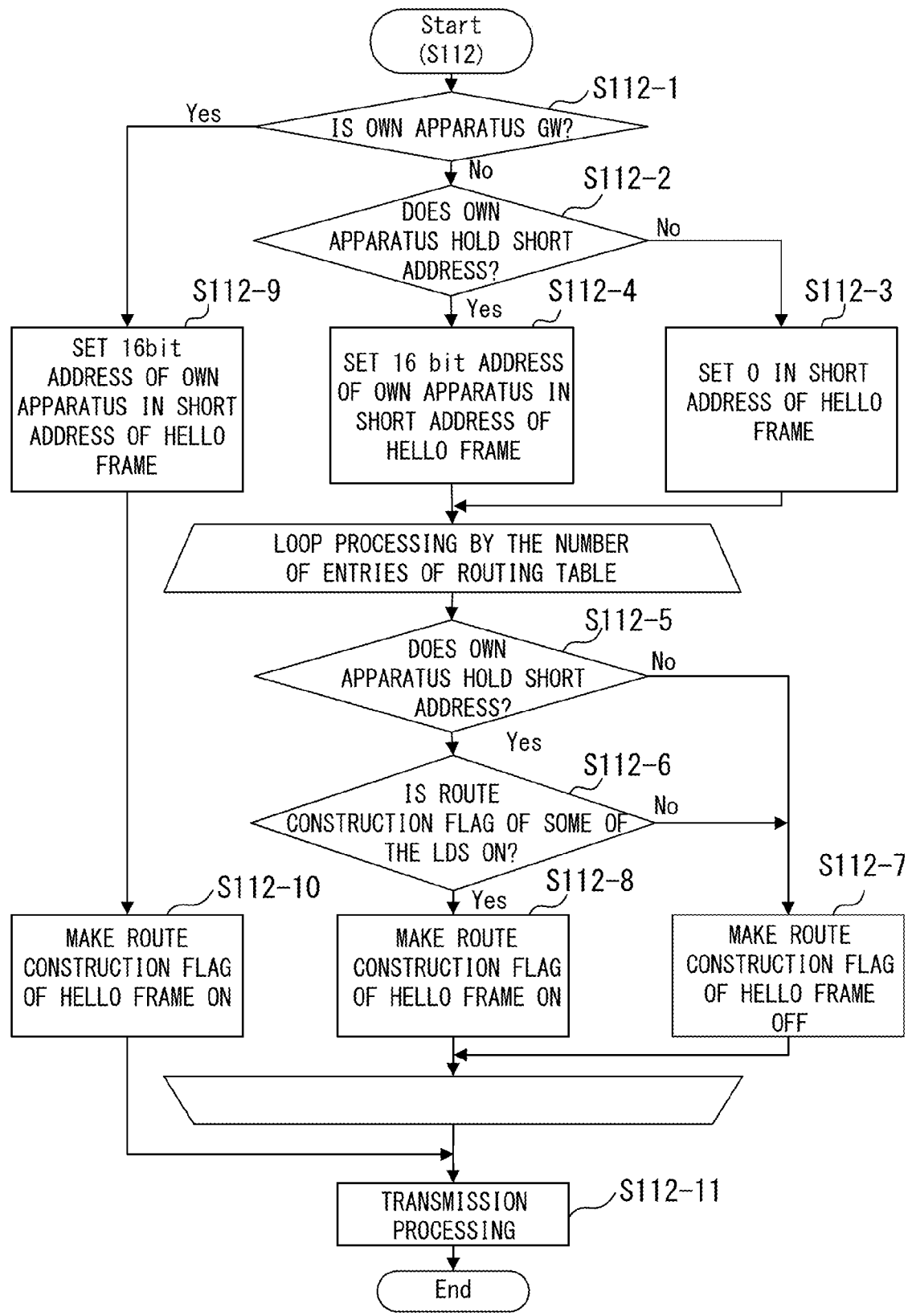
F I G. 4 1

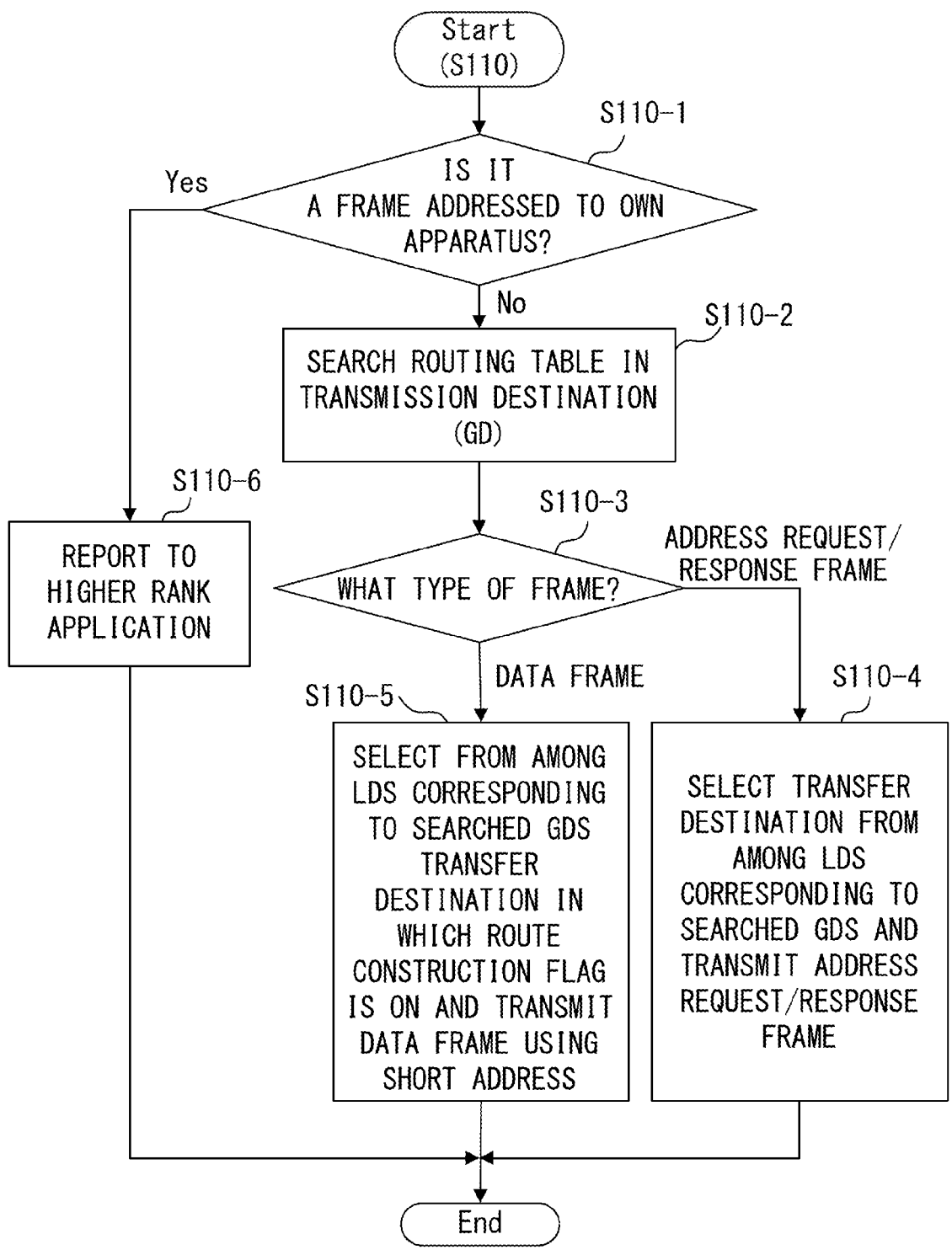
F I G. 43

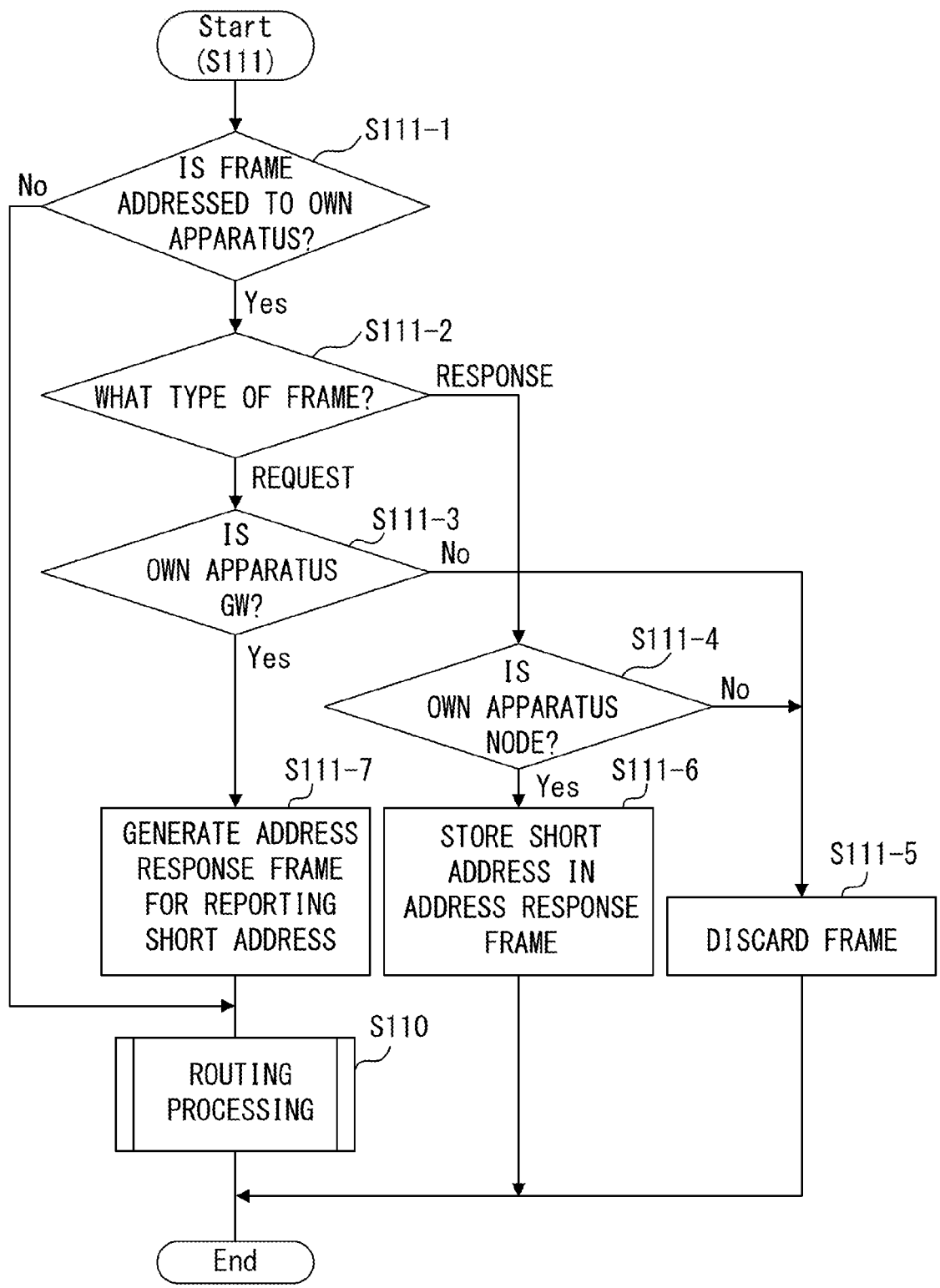
F I G. 44

NODE APPARATUS, RECORD MEDIUM FOR STORING CONTROL PROGRAM, WIRELESS COMMUNICATION SYSTEM, AND METHOD FOR DATA COMMUNICATION

CROSS-REFERENCE TO RELATED APPLICATION

This application is based upon and claims the benefit of priority of the prior Japanese Patent Application No. 2013-238140, filed on Nov. 18, 2013, the entire contents of which are incorporated herein by reference.

FIELD

The embodiments discussed herein relate to a wireless communication system which constructs a wireless communication network by performing a wireless communication between adjacent node apparatuses.

BACKGROUND

An ad hoc network communication technology refers to a communication technology in which each apparatus performs a direct communication without any access points between the apparatus. In recent years, a wireless ad hoc network technology has been attracting attention in which each communication apparatus to which the ad hoc communication technology is applied recognizes peripheral communication apparatus.

An example of a routing protocol of an ad hoc network (an ad hoc protocol) may include a reactive type AODV (an Adhoc On Demand Distance Vector Algorithm) or a proactive type OLSR (an Optimized Link State Routing). An example of the proactive type routing protocol includes a protocol that constructs a route for which each of the nodes autonomously performs a data communication prior to a communication request, learns an optimal route as needed, and changes the route.

The OLSR employs a scheme which grasps an entire network and detects the route to a target communication node, as each of the communication node apparatuses exchanges frames on a regular basis. Each of the communication node apparatuses sends out a HELLO frame cyclically and reports its existence with the others. When the existence of the communication node apparatus that becomes a communication partner is found, next, a path for flooding is generated to efficiently distribute a frame to the entire network. This is called an MPR (Multi Point Relay).

With the MPR, a frame may be efficiently broadcast from each of communication node apparatuses to the entire network. Next, as each of node apparatuses distributes to the others a TC (Topology Control) frame that is a route creation message by using the MPR, all of the node apparatus may know a network topology.

In sending a frame to a target communication node apparatus, the communication node apparatus that becomes a sending source refers to a network topology that the communication node apparatus knows and entrusts a frame to an adjacent communication node apparatus that is to be sent. The adjacent node apparatus performs similar processing and a frame is eventually delivered to the target node apparatus.

Examples of technologies with regard to the ad hoc network include the following technologies.

The first technology is directed to a method for participating in a wireless network of a wireless terminal that performs a wireless network communication with a service provider through a plurality of relay devices (for example, Patent Document 1). According to the first technology, in performing a wireless network communication, a wireless terminal accesses a specified relay device and transmits its own address. The relay device that has received the address of the wireless terminal by this transmission reports the address to the other adjacent relay device and establishes a communication route between the wireless terminal and the service provider.

Further, there is the second technology of suppressing a communication between a Kernel space and a user space that is generated at the time of packet transfer processing (for example, Patent Document 2). According to the second technology, a mobile communication apparatus includes a route table that has route information. When receiving a packet from a node N1 addressed to a node N2, a route decision unit within the Kernel space decides whether or not there is route information addressed to a node N2 in the route table. When there is route information, the Kernel space transmits a packet to a node N2. When there is no route information, the Kernel space requests that the user space explore route information. The Kernel space 20 transmits the packet to the node N2 after it has received the explored route information. With the operations mentioned above, a communication occurs between the Kernel space and the user space only when there is no route information within the route table RT.

Further, there is the third technology in which even though each of node apparatuses does not recognize a network topology at the time when data is transmitted, as a result of autonomous distribution processing by each of the node apparatuses, as an entire network, an appropriate route is selected and data is transmitted (for example, Patent Document 3). In the third technology, when the frame that has been transmitted by the above mentioned node apparatus is received by the above mentioned node apparatus through a network, an adjacent node apparatus that differs from the adjacent node apparatus that was selected previously is tested as a transmission destination. And when there is no transmittable adjacent node apparatus, a reception frame is transmitted to the third adjacent node apparatus by a backtracking means, and accordingly, another new route may be tested by the third adjacent node apparatus.

Patent Document 1: Japanese Laid-open Patent Publication No. 2006-129381
Patent Document 2: Japanese Laid-open Patent Publication No. 2005-260299
Patent Document 3: International Patent Application Publication No. 2011/013165

SUMMARY

According to an aspect of the present embodiments, a node apparatus is a first node apparatus configured to construct a wireless communication network by wirelessly communicating with an adjacent node apparatus. The node apparatus includes a storage unit, a control unit and a transmission unit. The storage unit store construction completion decision information on a second node apparatus acquired from the second node apparatus that is adjacent to the first node apparatus. The construction completion decision information indicates whether or not a route between a target transmission destination and the second node apparatus has been constructed using an address with a specified size that specifies anode apparatus in the wireless communication network. The control unit configured to perform processes including: acquiring a first address that is an address with the specified size that specifies the first node apparatus; and transmitting to one or more adjacent node apparatuses the construction completion decision information on the first node apparatus indicating that the route between the target transmission destination and the first node apparatus has been constructed using an address with a specified size, when the construction completion decision information on the second node apparatus has indicated that the route between the target transmission destination and the second node apparatus has been constructed using the address with the specified size and when the first address has been acquired. The transmission unit configured to transmit a data frame by using the first address, when the construction completion decision information on the first node apparatus is transmitted.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a view (No. 1) that explains a transmission of a data frame between nodes and between a node and a GW (links) when a normally used arbitrary address is replaced by a short address.

FIG. 2 is a view (No. 2) that explains a transmission of a data frame between nodes and between a node and a GW (links) when a normally used arbitrary address is replaced by a short address.

FIG. 5 illustrates an example of a wireless communication system in the present embodiments.

FIG. 7 illustrates a format of a HELLO frame in the present embodiments.

FIG. 9 illustrates an example of a routing table in the present embodiments.

FIG. 12 is a view (No. 1) that explains processing of a data transmission by using a short address in the present embodiments.

FIG. 20 is a view (No. 1) that explains an example when nodes A, B, and C in the present embodiments (Example 1) sequentially make an address request for a short address.

FIG. 21 is a view (No. 2) that explains an example when nodes A, B, and C in the present embodiments (Example 1) sequentially make an address request for a short address.

FIG. 23 is a view (No. 4) that explains an example when nodes A, B, and C in the present embodiments (Example 1) sequentially make an address request for a short address.

FIG. 26 is a view (No. 1) that explains an example when nodes C, A, and B in the present embodiments (Example 2) sequentially make an address request for a short address and when each of the nodes has completed a route construction using a short address.

FIG. 28 is a view (No. 3) that explains an example when nodes C, A, and B in the present embodiments (Example 2) sequentially make an address request for a short address and when each of the nodes has completed a route construction using a short address.

FIG. 31 illustrates a network in which a route construction has been completed using a short address and illustrates a routing table of each of the nodes in the present embodiments (Example 3-1).

FIG. 41 illustrates a detailed flow of HELLO frame generation/transmission processing (S112) in the present embodiments (Examples 1 to 4).

FIG. 43 illustrates a detailed flow of routing processing (S110) in the present embodiments (Examples 1 to 4).

FIG. 44 illustrates a detailed flow of address request/response reception processing (S111) in the present embodiments (Examples 1 to 4).

DESCRIPTION OF EMBODIMENTS

Figure 3:
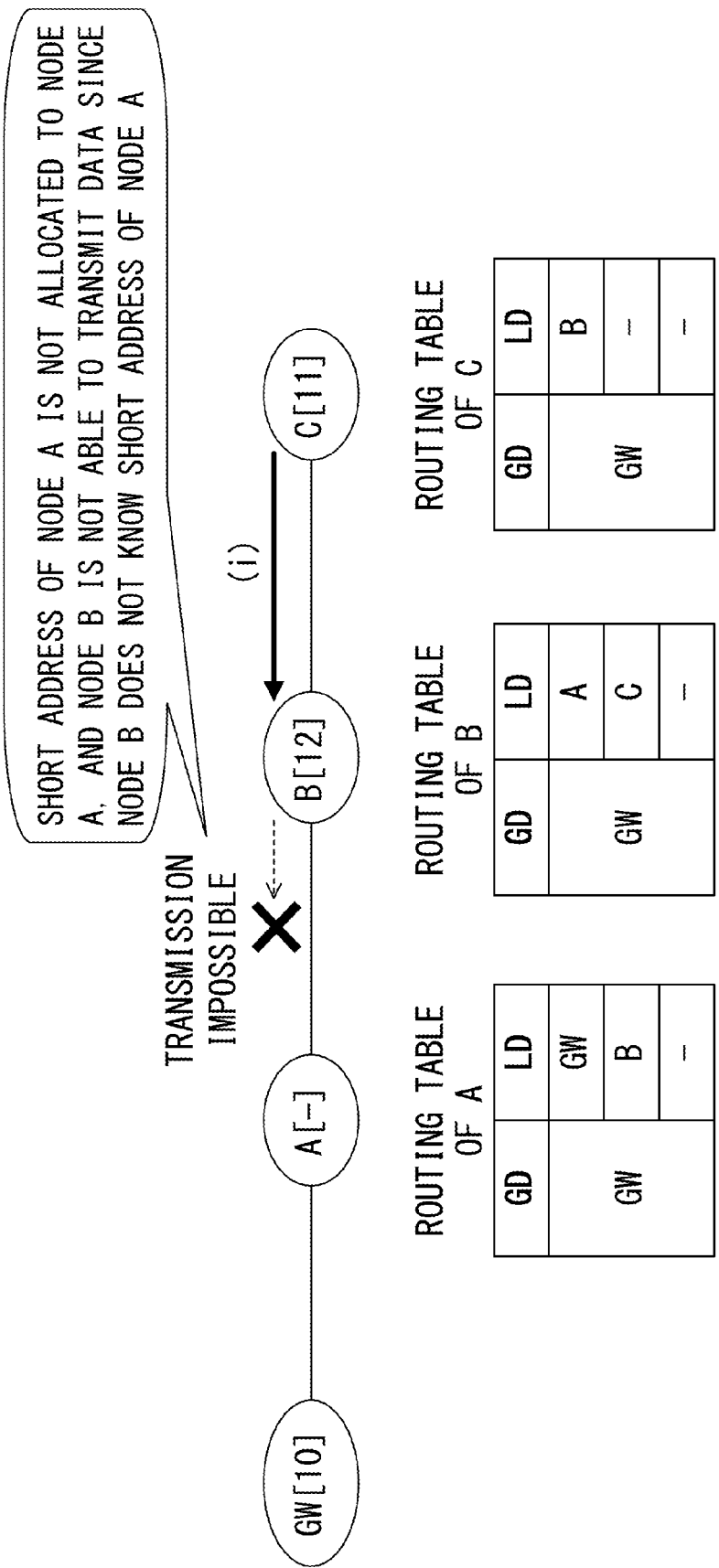
FIG. 3 is a view (No. 3) that explains a transmission of a data frame between nodes and between a node and a GW (links) when a normally used arbitrary address is replaced by a short address.

In one example of the ad hoc network, by using an arbitrary address (e.g., a 64-bit address or a 48-bit address (a MAC address or the like)) that is normally used in a route construction using a transmission and reception of a HELLO frame, a header of a data frame is generated and transmitted.

However, in a specified low-wireless environment in which a maximum transmission unit (MTU) that may be transmitted at once by the network is small, when a data frame to be transmitted is limited, in order to secure a longer payload length, shortening a header length is considered. As one example of shortening the header length, performing data transmission by using an address that is shorter than a normally used address (short address) is considered.

A case in which an address of a 16-bit length is used as a short address is assumed, for example. An address is allocated to each of the nodes from a gateway apparatus (a GW) in response to an address request that is generated randomly from each of the nodes. However, since an order in which each of the nodes transmits the address request is random, even when a certain node transmits data to the GW immediately after a short address is allocated, the short address may not be held by the node in the middle of the route. In this case, since routing information between the certain node and the GW has not been constructed, the data may not reach the GW even though the node transmits the data frame to the GW, and there is a concern that useless traffic may be generated within the network.

According to an aspect of the present embodiments, a technology of performing a data transmission by constructing an efficient route in transmitting data by a data frame that uses an address with a specified size is provided.

First, explanations are given for terms that are used herein.

A "frame" refers to a data unit handled by a protocol. Although a "HELLO frame" and a "data frame" are included in a "frame", examples are not limited to these.

A "HELLO frame" is a type of a control frame for communicating control information and it refers to a special frame that node apparatus sends out to the other node apparatus for confirming each other's existence and state. A "HELLO frame" may simply be called HELLO.

A "data frame" refers to data that the network tries to transfer (from a start node to a goal node). The node apparatus may naturally have an appropriate means for identifying a "HELLO frame" and a "data frame".

A "Local Destination (LD)" refers to a destination node ID that indicates an adjacent node apparatus to which the frame is to be delivered subsequently when a certain node apparatus is seen as an acting agent. The LD may also be called a "local destination address" herein.

A "Local Source (LS)" refers to a node ID that indicates a node apparatus that is a direct transmission source for transmitting a frame to the LD. The LS may also be called a "local sender address" herein. In the meantime, a node of interest is also called a target node.

A "Global Destination (GD)" refers to a node ID that becomes a final destination for a series of propagations over a network of a data frame. A GD may also be called a "global destination address" herein.

A "Global Source (GS)" refers to a node ID that becomes a first sender for a series of propagations over a network of a data frame. A GS may also be called a "global sender address" herein.

As mentioned above, in a micro-sized radio that has a short MTU, a payload length that may be used in a higher rank application becomes short with a scheme of transmitting data by using a normally used arbitrary address. Accordingly, when large data is transmitted, it must be transmitted by dividing the data into a plurality of pieces of data. Consequently, network traffic increases. In order to secure more payload areas that may be used in the higher rank application, reducing the network traffic by using a short address with a bit size such as 16 bits instead of using a MAC address of 48 bits is considered. Here, the application refers to an application layer in the node. Report information on the detection of the GW for the application is information that is necessary for exchanging node information or sensor information from End to End (a GW (or a server further ahead) and a node A).

Hereinafter, in reference to FIG. 1 to FIG. 4, explanations are given first for transmitting a data frame between nodes and between a node and a GW (between links) when replacing a normally used arbitrary address with a short address as mentioned above.

FIG. 1 illustrates a state in which a route construction has been completed by passing the HELLO frame between nodes by using a normally used arbitrary address and in which each node reports the detection of the GW to the application. In FIG. 1, since the route construction has already been completed by passing the HELLO frame between nodes, a data frame may be transmitted by a normal procedure, by using a normally used arbitrary address. However, in order to secure a longer payload length for a data frame to be transmitted, it is assumed, in FIG. 1 to FIG. 4, that a short address is used. A short address allocated to each node is a unique address in an ad hoc network, and is managed by a communication apparatus such as a GW. The communication apparatus such as the GW transmits a short address to each of the nodes upon receiving an address request from each of the nodes.

Since a network becomes congested when there are many nodes and when these nodes make address requests simultaneously to the GW, each node makes address requests autonomously by distributing the address requests. In this case, as explained in FIG. 2, a short address may be allocated to nodes B and C earlier than to a node A.

As illustrated in FIG. 2, when nodes B and C make an address request/response to the GW, a short address is allocated to the nodes B and C from the GW. After that, the node C transmits data to the GW by using the short address.

Figure 4:
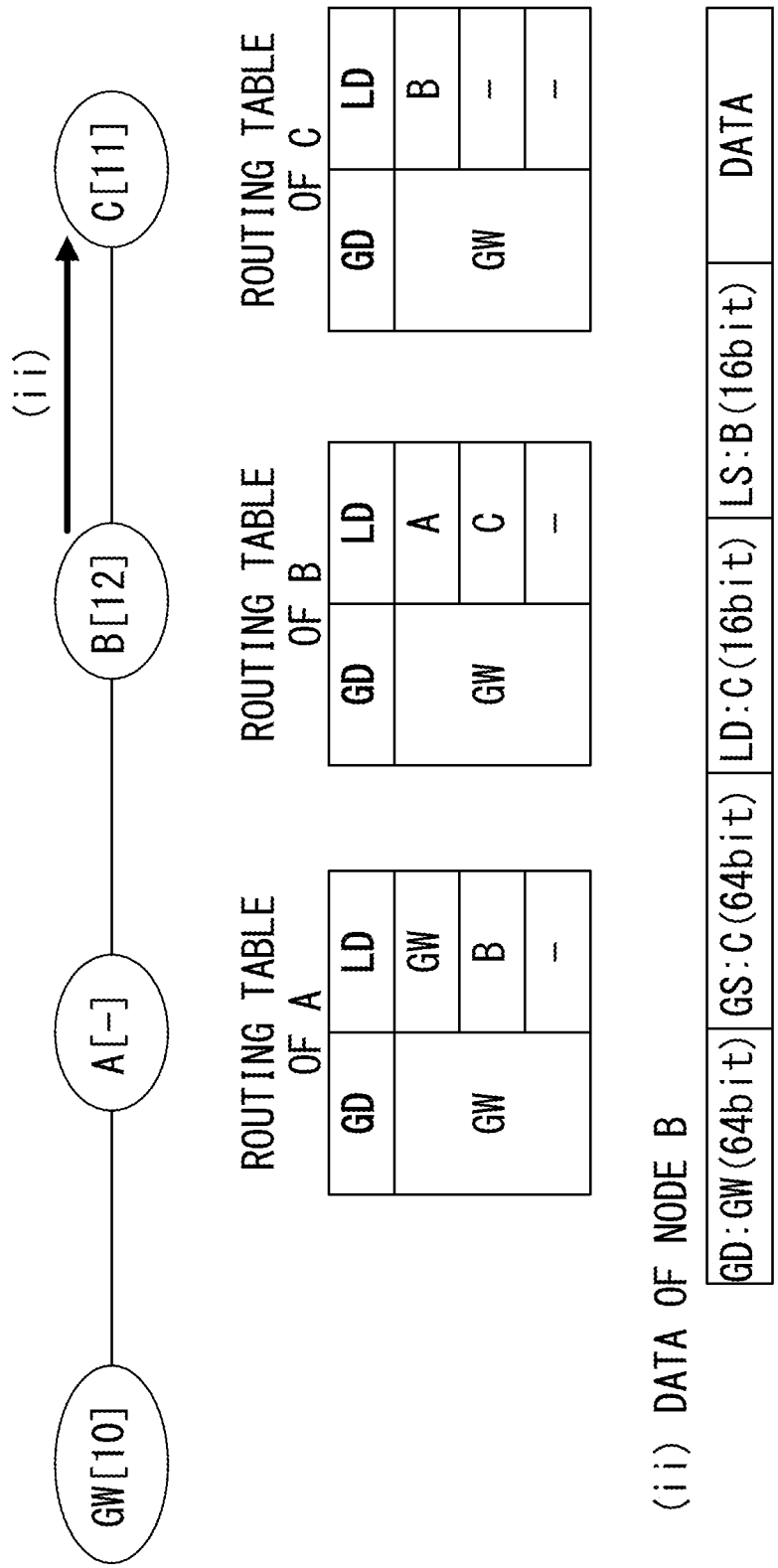
FIG. 4 is a view (No. 4) that explains a transmission of a data frame between nodes and between a node and a GW (links) when a normally used arbitrary address is replaced by a short address.

At this time, the node A is in a state at which it has not been allocated a short address. Therefore, as illustrated in FIG. 3, even when the node B tries to transmit data (i) that was transmitted from the node C to the node B addressed to the GW, since the node B does not know the short address of the node A that has a high priority from among LDs addressed to the GW, the node B is not able to transmit data to the node A. In this case, since the node B was not able to transmit the data to the node A, and also, since there is no route to be transmitted to another node, the node B returns the data frame (ii) to the node C that is a transmission source, as illustrated in FIG. 4.

As mentioned above, since the node C that is a data transmission source is not able to detect that the node A in the middle of the route does not hold the short address, the node C transmits the data even though the route has not been constructed using the short address. As a result, the node C transmits a useless frame to the network.

Therefore, since the order of allocating a short address is random, even when the data is transmitted immediately after its own short address is allocated, the short address may not be allocated to the node that is in the middle of the route. In this case, since the frame may not reach the final destination (the GW), useless traffic is generated in the network.

Therefore, the present embodiments are configured to prevent a generation of useless traffic in the network as the target node transmits a data frame by using the short address, when the network has acquired information that the route construction has been completed between the adjacent node and the server and when it has acquired its own short address.

Then, hereinafter, detailed explanations are given for the present embodiments.

FIG. 5 illustrates an example of a wireless communication system in the present embodiments. A wireless communication system 8 includes a server 7, and a plurality of nodes 1, 1a, . . . . The node apparatus constructs a wireless communication network by performing a wireless communication between adjacent node apparatuses. The server 7 transmits to each of the plurality of node apparatuses an address with a specified size that specifies each of the plurality of the node apparatuses 1, 1a, in a wireless communication network. An example of the server 7 includes a GW 12.

The node apparatus 1 includes a storage unit 2, a first acquiring unit 3, a reporting unit 4, and a transmission unit 5. An example of the node apparatus 1 includes a node 11.

The storage unit 2 stores construction completion decision information on a second node apparatus that has been acquired from the second node apparatus adjacent to the first node apparatus that is the above-mentioned node apparatus. The construction completion decision information indicates whether or not the route between a target transmission destination and the second node apparatus has been constructed, the route being constructed using an address with a specified size that specifies the node apparatus in the wireless communication network. An example of the storage unit 2 includes a storage unit 34 that stores a routing table 35.

The first acquiring unit 3 acquires from the server 7 a first address that is an address with a specified size that specifies the first node apparatus. An example of the first acquiring unit 3 includes a control unit 21 that performs address request/response processing 27.

The reporting unit 4 performs the following processing when construction completion decision information on the second node apparatus indicates that the route between the target transmission destination and the second node apparatus has been constructed, the route being constructed using an address with a specified size, and when the first address has been acquired. Namely, the reporting unit 4 transmits to one or more the adjacent node apparatuses the construction completion decision information on the first node apparatus indicating that the route between the target transmission destination and the first node apparatus has been constructed, the route being constructed using the address with a specified size. An example of the reporting unit includes a control unit 21 that performs HELLO control processing 22.

The transmission unit 5 transmits a data frame by using a first address when the construction completion decision information on the first node apparatus has been transmitted. An example of the transmission unit 5 includes a control unit 21 that performs routing processing 26.

The node apparatus 1 further includes a second acquiring unit 6. The second acquiring unit 6 acquires from the second node apparatus a second address that is an address with a specified size that specifies the second node apparatus. An example of the acquiring unit 6 includes a control unit 21 that performs route construction processing 25. At this time, the transmission unit 5 sets a first address and a second address respectively for a transmission source field and a transmission destination field that are used for transmitting the data frame included in the header of the data frame to the next transmission destination.

The transmission unit 5 refers to the storage unit 2 and selects one or more second node apparatuses from among the second node apparatus in which a route using an address with a specified size with the target transmission destination has been constructed. The transmission unit 5 transmits a data frame to the selected second node apparatus by using the first address and the second address.

By configuring the embodiments as mentioned above, data may be transmitted by constructing an efficient route for transmitting the data using the data frame with the address with the specified size. In particular, when a short address is used as the address with the specified size, the data may be transmitted by constructing an efficient route for transmitting the data using the data frame in which a ratio of the payload size is increased with respect to a maximum data size that may be transmitted once by the wireless communication network.

Further, the node apparatus judges that the route using the short address from the GW (the GD) to the node itself has been constructed, when the short address of its own node has been acquired, and when a route construction flag of the HELLO frame received from the adjacent node is ON. In this case, the node apparatus imparts a route construction flag=ON to the HELLO frame and transmits the HELLO frame. By spreading it over the entire ad hoc network, the route using the short address used in transmitting data may be constructed.

Figure 6:
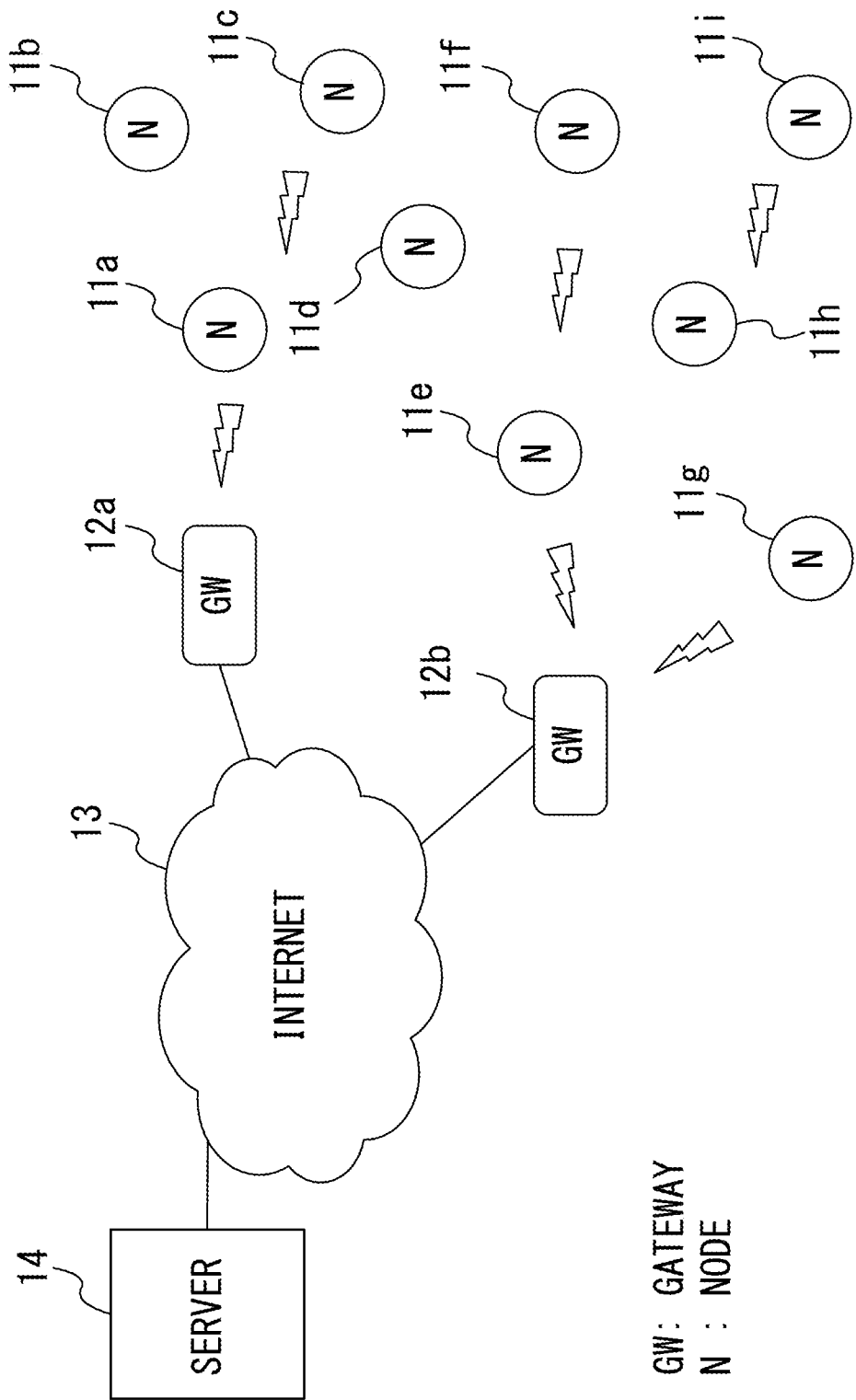
FIG. 6 illustrates an example of an ad hoc network configuration in the present embodiments.

FIG. 6 illustrates an example of an ad hoc network configuration in the present embodiments. To an internet 13, a server 14 and gateway apparatuses (GWs) 12a and 12b are connected. The GWs 12a and 12b are apparatuses for relaying a connection between networks, and the GWs 12a and 12b convert data of different communication protocols with each other to relay data. In FIG. 1, the GWs convert the communication protocol and the ad hoc protocol used in the L3 with each other to realize the communication. The GW 12a and GW 12b are collectively called a "GW 12". In the GW 12, the communication apparatus in which the wireless ad hoc communication technology is installed is used as an interface with the ad hoc network.

The node apparatus (hereinafter called a "node") 11a to 11i is a communication terminal in which the wireless ad hoc communication technology is installed. Here, nodes 11a to 11i are collectively called a node 11. In each node 11, between the adjacent nodes, a transmission and reception of the HELLO frame that includes route information and node information such as communication quality information of the link between nodes is performed regularly between adjacent nodes. The HELLO frame refers to the frame that is sent out by the node 11 or the GW 12 according to the present embodiments for confirming the existence and the state of the other node apparatus 11 or the GW 12. The HELLO frame is transmitted or received in the wireless ad hoc network that is formed between nodes or between the node and the GW. With this, the node 11 calculates the communication quality of each route in accordance with the information of the HELLO frame, constructs the plurality of the routes to the final destination, and decides the optimal route on the basis of the calculation result.

First, the GW 12 performs a broadcast transmission of the HELLO frame that includes node information (route information/communication quality information of the link between nodes) held by the GW 12, when a timing for transmitting the HELLO frame has come. The node 11 that is adjacent to the GW 12 receives the HELLO frame from the GW 12.

The node (e.g., the node 11a), when receiving the HELLO frame from the GW 12, registers the GW 12 in a route information table (a routing table) held by the node. Together with this, the node (e.g., the node 11a) uses the node information included in the HELLO frame that was received from the GW 12, the node information being held by the GW 12, and calculates a route quality and a communication quality of a link between nodes. The node (e.g., the node 11a) registers the calculation result in a route information table (a routing table) and a link information table (a link table). The node 11 does not perform re-broadcasting (flooding) of the HELLO frame that was received from the GW 12.

Next, in each of the nodes (e.g., the node 11a), when a timing for transmitting the HELLO frame has come, the HELLO frame that includes node information held by the node is broadcast. The HELLO frame transmitted by the node includes information on GW12 and other nodes.

The node (e.g., a node 11b) receives the HELLO frame from the node (e.g., a node 11a) and registers the node 11a in the routing table. Along with this, the node (e.g., the node 11b) calculates its route quality/link quality and registers the calculation result in the routing table/link table.

Similarly to the node 11a, other nodes perform a broadcast transmission of the HELLO frame when the timing for transmitting each of the HELLO frames has come. In each of the nodes, a plurality of routes addressed to the GW are constructed, and using the route quality/link quality information in each of the routes, the optimal route to the final destination (the GW) is decided.

Thus, as each of the nodes exchanges the HELLO frames, route information/quality information is propagated between nodes, and a plurality of routes to the final destination (the GW) are constructed in each of the nodes.

FIG. 7 illustrates a format of a HELLO frame in the present embodiments. The HELLO frame includes a header based on a communication protocol and a data item of a payload that indicates a data part. The header of the HELLO frame includes a field of an "LD", an "LS", a "short address", a "GD", and a "route construction flag".

A local destination address is set in the field "LD". A local sender address is set in the field "LS". A global destination address is set in the field "GD". The node sets in the LD of the HELLO frame a specified value called "FF" that is a particular kind of a value indicating a broadcast to all of the adjacent node apparatus, and sets the address of its own node in the LS.

Please note that "broadcast" here means the "broadcast to all adjacent node apparatuses" and not "flooding to an entire network".

A "short address" is an address that has a size that is smaller than a normally used arbitrary address such as a 16-bit address, and the short address indicates information for uniquely identifying the node in the ad hoc network. When the short address is allocated by the GW to the node that transmits the HELLO frame, the allocated short address is set in the "short address" of the HELLO frame. When the short address is not allocated to the node that transmits the HELLO frame, "0" (an invalid value) is set in the "short address" of the HELLO frame. Although in the present embodiments, a 16-bit size is used as the short address, it is not limited to this, and an 8-bit size, 32-bit size and the like may be used, in accordance with the number of nodes in the ad hoc network, for example.

A "route construction flag" is a flag indicating that a route has been constructed that uses the short address to the node that is adjacent to the target node. The route construction flag=OFF indicates that a route has not been constructed that uses the short address to the adjacent node, and the route construction flag=ON indicates that a route has been constructed that uses the short address to the adjacent node.

Figure 8:
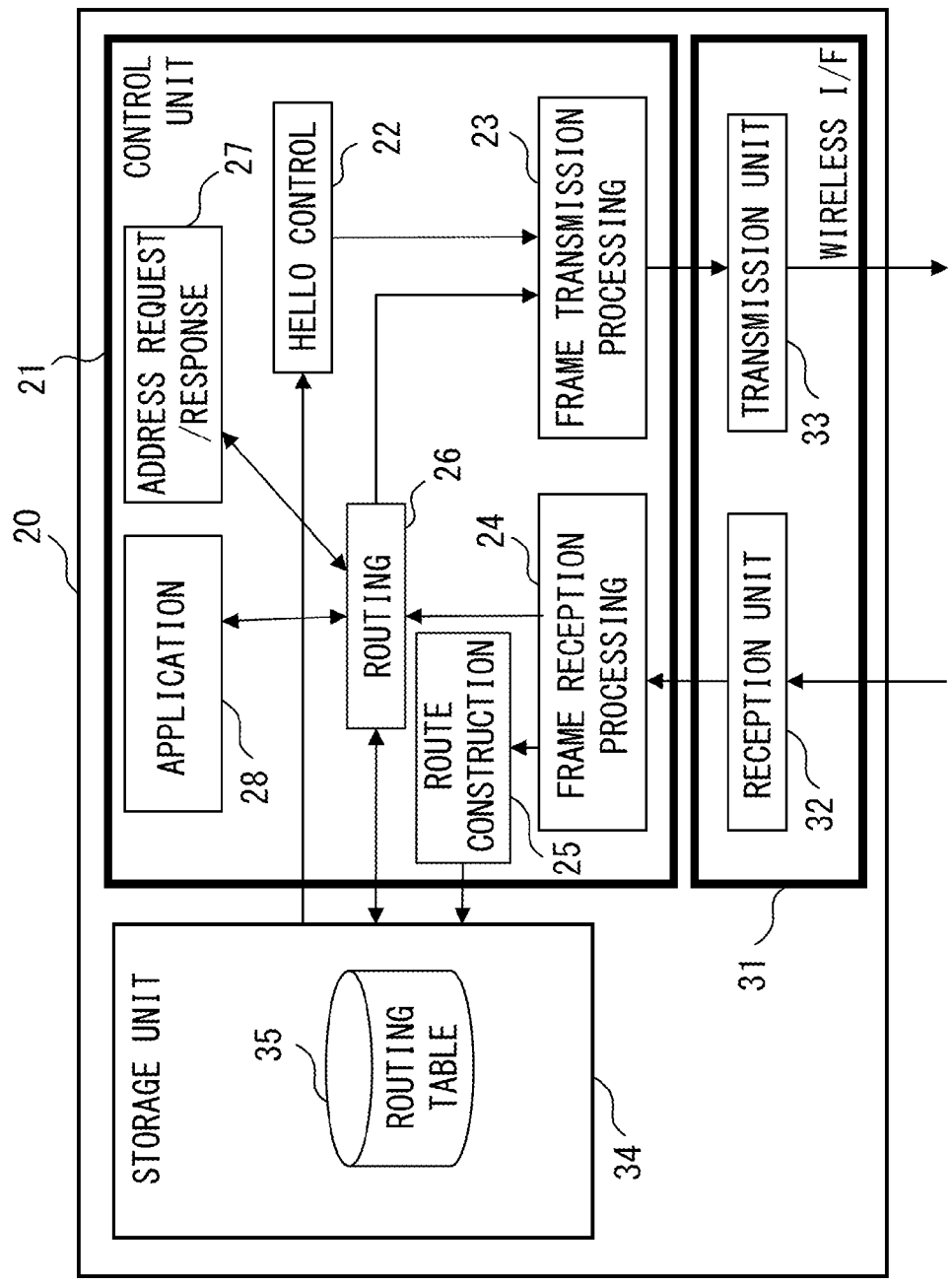
FIG. 8 illustrates an example of a functional block diagram of a communication apparatus for transmitting and receiving a frame in the present embodiments.

FIG. 8 illustrates an example of a functional block diagram of a communication apparatus in a frame transmission and reception in the present embodiments. The communication apparatus 20 is the apparatus that constructs the ad hoc network and that installs a wireless ad hoc communication technology. Although the communication apparatus 20 is the node 11 in the present embodiments, the communication apparatus 20 may also be used for an interface with the ad hoc network in the GW12. Hereinafter, explanations are given assuming that the communication apparatus 20 is the node apparatus.

The communication apparatus 20 includes a control unit 21, a wireless communication interface (hereinafter called a "wireless I/F") 31, and a storage unit 34. A routing table 35, a link table and the like are stored in the storage unit 34. Further, the short address that is allocated by the GW 12 is stored in the storage unit 34.

The wireless I/F 31 includes a reception unit 32 and a transmission unit 33 and performs processing to communicate with other nodes. The reception unit 32 receives a signal of the frame that has been transmitted to the node 11 and outputs the received signal to a frame reception processing unit 24.

The control unit 21 reads out the program that is stored in the storage unit 34 and the like, and performs HELLO control processing 22, frame transmission processing 23, frame reception processing 24, route construction processing 25, routing processing 26, and address request/response processing 27.

The frame reception processing 24 converts the signal that was input from the reception unit 32 into a frame that may be processed by the routing processing 26 and the route construction processing 25. Frames obtained by the conversion of the frame reception processing 24 include a route information frame, a control frame other than the route information frame, a data frame that stores the user data, and the like. The frame reception processing 24 outputs the obtained frame to the routing processing 26 and the route construction processing 25.

The address request/response processing 27 generates a request frame that makes a request from the GW for the network address (simply called an "address") allocated to the target node owning the address request/response processing 27. The address request/response processing 27 transmits the request frame via the frame transmission processing 23. Here, addresses include normally used arbitrary addresses and short addresses. The address request/response processing 27, when receiving the response frame for the request frame from the GW 12, acquires the address from the response frame and stores it in the storage unit 34 via the routing processing 26.

The application program (hereinafter called an "application") 28 is a program that provides a communication service in a seventh layer (an application layer) in an OSI (Open System Interconnection) reference model. The application 28 processes the input frame when the frame addressed to the node 11 is input from the routing processing 26. In addition, the application 28 may also generate a data frame to be transmitted to the other node 11 by the processing of the application program. The application 28 outputs the generated data frame to the routing processing 26.

The routing processing 26 judges whether or not the input frame is addressed to the target node owning the routing processing 26 or for a broadcast transmission. When the routing processing 26 judges that the input frame is addressed to the target node, it performs processing of sorting frames. The routing processing 26 registers the transmission source of the received HELLO frame in the routing table 35, on the basis of the ad hoc header included in the input frame. The routing processing 26 controls the transmission unit 33 so as to transmit the frame that includes information registered in the routing table 35 or the link table.

The routing processing 26 further performs the following processing when the target node has received its own short address and when the target node has received from the adjacent node the HELLO frame in which ON is set in the route construction flag. Namely, the routing processing 26 sets its own short address in the LS of the data frame, and sets the short address of the transmission destination in which the route construction flag is ON from among the LDs that correspond to the GDs that have been searched for in the routing table. The routing processing 26 controls the transmission unit 33 so as to transmit the data frame in which the short address is set.

The route construction processing 25 uses node information included in the received HELLO frame, calculates a route quality or a communication quality of the link between nodes, and registers the result in the routing table 35 or the link table. Further, when a short address of the adjacent node is set in the received HELLO frame, the route construction processing 25 registers the short address in the routing table 35.

The HELLO control processing 22 uses information registered in the routing table 35 to generate the HELLO frame, and performs a broadcast transmission of the HELLO frame via the frame transmission processing unit 23. The HELLO control processing 22 may generate a HELLO frame that includes information on a route included in the routing table 35.

Further, the HELLO control processing 22 performs the following processing, when the target node has received its own short address and when the target node has received from the adjacent node the HELLO frame in which ON is set in the route construction flag. Namely, the HELLO control processing 22 generates the HELLO frame in which ON is set in the route construction flag and performs a broadcast transmission of the HELLO frame via the frame transmission processing unit 23. With this, the target node may report to the adjacent nodes that the route construction using the short address from the GD to the target node itself has been completed.

The frame transmission processing unit 23 controls the transmission unit 33 and transmits the frame.

FIG. 9 illustrates an example of a routing table in the present embodiments. Each of the nodes has a routing table that holds routing information for the adjacent nodes that are managed by the final destination node (GD) unit.

The routing table 35 includes data items of a "GD", an "LD", a "route construction flag", and a "short address". A "GD" indicates a global destination address. An "LD" indicates a local destination address. In the LD, using the GD unit, a specified number (e.g., three) of routes (a first candidate (LD1), a second candidate (LD2), and a third candidate (LD3)) are stored in the order beginning from a larger reception intensity (or a better communication quality) from among a plurality of routes to the local destination node.

A "route construction flag" is the flag indicating that the route which uses a short address has been constructed from the GD to a adjacent node (the LD) that is adjacent to the target node. The route construction flag=OFF indicates that the route that uses the short address has not been constructed from the GD to the adjacent node (the LD). The route construction flag=ON indicates that the route that uses the short address has been constructed from the GD to the adjacent node (the LD). The values of the route construction flag of the routing table 35 are changed in accordance with the values of the route construction flag in the HELLO frame that has been received from the adjacent node.

In the "short address", the short address that corresponds to the adjacent node set in the LD is stored. Although in the present embodiments, the short address that corresponds to the adjacent node is registered in the routing table, the embodiments are not limited to this, and the short address may be managed in another table on the condition that the short address is associated with the LD that is registered in the routing table.

Figure 10:
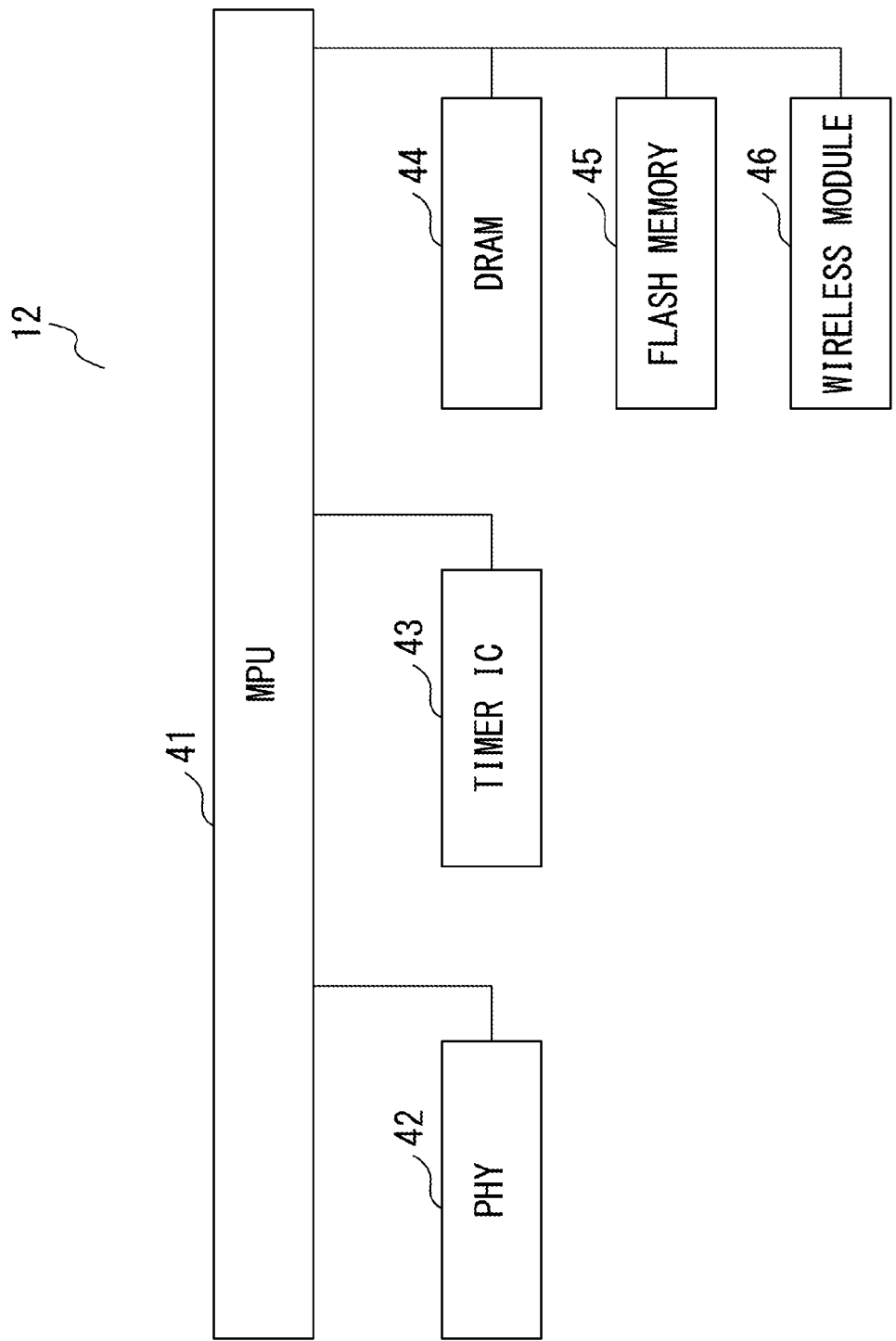
FIG. 10 illustrates an example of a hardware configuration of a GW in the present embodiments.

FIG. 10 illustrates an example of a hardware configuration of a GW in the present embodiments. The GW 12 includes a Micro Processing Unit (MPU) 41, a PHYsical layer (PHY) chip 42, a timer IC (Integrated Circuit) 43, a Dynamic Random access Memory (DRAM) 44, a flash memory 45, and a wireless module 46. The MPU 41, the PHYsical layer (PHY) chip 42, the timer IC 43, the DRAM 44, the flash memory 45, and the wireless module 46 are connected by a bus so that the data may be input and output.

The MPU 41 reads a program such as firmware stored in the flash memory 45 and performs processing. At this time, the MPU 41 may use the DRAM 44 as a working memory. When the communication apparatus 20 operates as the GW 12, the MPU 41 functions as the control unit 21.

The PHY chip 42 converts the output from the MPU 41 into a signal in accordance with a type of the output destination (i.e., an electric signal or an optical signal) and outputs it. Thus, the GW 12 may transmit the data to an external network by using the PHY chip. The PHY chip 42 may also convert the electric signal or optical signal input from the external network via a cable and a wired LAN port into a logical signal and output the logical signal to the MPU 41. Thus, the GW 12 may receive the data from the external network by using the PHY chip 42. The PHY chip 42 is optional and the GW 12 may communicate using a line via the PHY chip 42. For example, the GW 12 that operates as a gateway between a layer 3 (L3) network and an ad hoc network may communicate with the communication apparatus in the L3 network by using the PHY chip 42. The timer IC 43 operates as the timer.

The wireless module 46 is hardware that performs processing of a physical layer in the wireless connection. The wireless module 46 includes, for example, an antenna, an ADC (an Analog-to-Digital Converter), a DAC (a Digital-to-Analog Converter), a modulator, a demodulator, an encoder, and a decoder.

The program such as firmware and the like may be provided by being stored in a computer readable storage medium and installed in the GW 12. Alternatively, the program may be installed in the GW 12 by being downloaded from a network via the PHY chip 42 or the wireless module 46. Further, another type of a storage device that is different from the DRAM 44 or flash memory 45 may be used in accordance with the embodiments.

Figure 11:
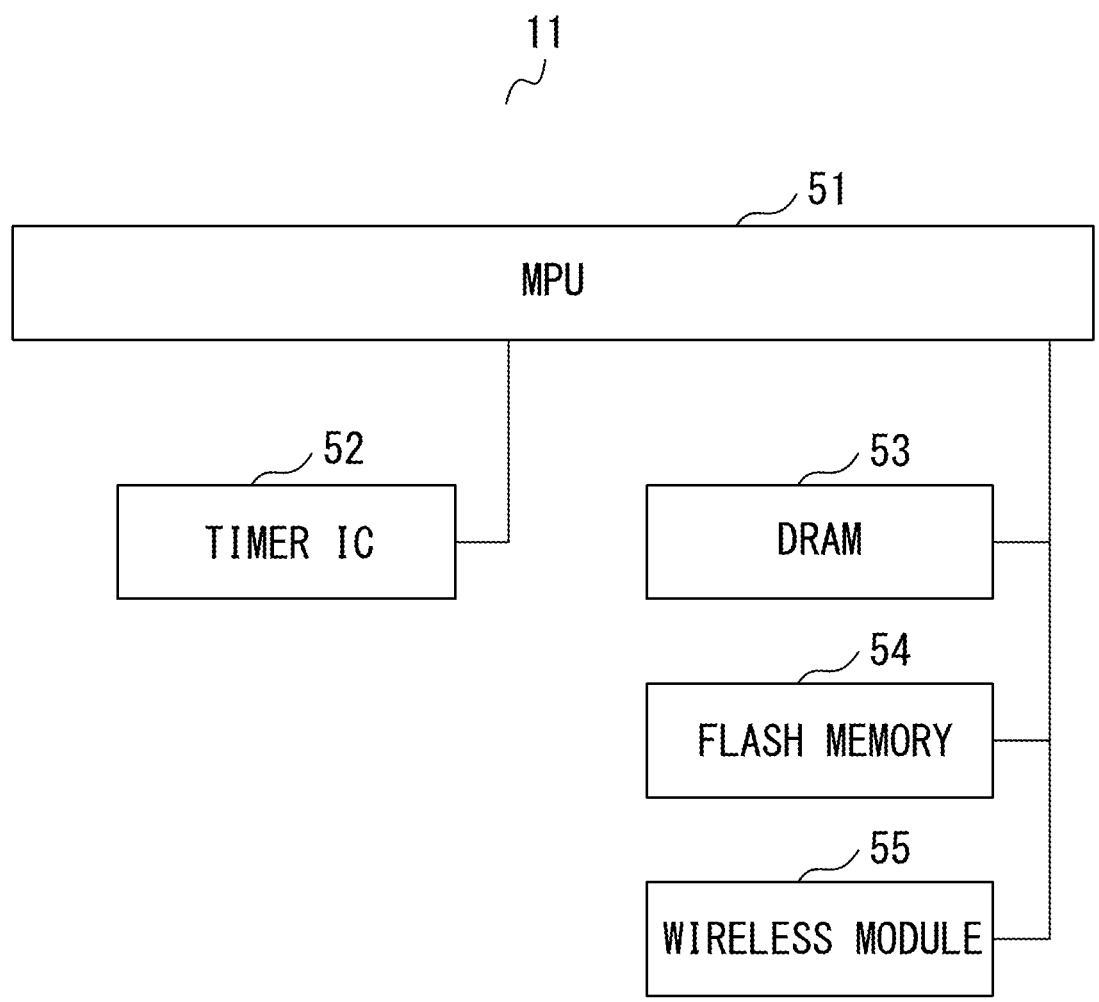
FIG. 11 illustrates an example of a hardware configuration of a node in the present embodiments.

FIG. 11 illustrates an example of a hardware configuration of a node in the present embodiments. The node 11 includes a Micro Processing Unit (MPU) 51, a timer IC (Integrated Circuit) 52, a Dynamic Random access Memory (DRAM) 53, a flash memory 54, and a wireless module 55. The MPU 51, the timer IC (Integrated Circuit) 52, the Dynamic Random access Memory (DRAM) 53, the flash memory 54, and the wireless module 55 are connected by a bus so that the data may be input and output.

The MPU 51 reads the program such as firmware stored in the flash memory 54 and performs processing. At this time, the MPU 51 may use the DRAM 53 as a working memory. When the communication apparatus 20 operates as the node 11, the MPU 51 functions as the control unit 21. The flash memory 54 functions as the storage unit 34. The timer IC 43 operates as the timer.

The wireless module 55 is hardware that performs processing of a physical layer in the wireless connection. The wireless module 55 includes, for example, an antenna, an ADC (Analog-to-Digital Converter), a DAC (Digital-to-Analog Converter), a modulator, a demodulator, an encoder, and a decoder. The wireless module 55 functions as the wireless I/F 31.

The program such as firmware and the like may be provided by being stored in a computer readable storage medium and installed in the node 11. Alternatively, the program may be installed in the node 11 by being downloaded from a network via the wireless module 55. Further, another type of a storage device that is different from the DRAM 53 or flash memory 54 may be used in accordance with the embodiments.

FIG. 12 to FIG. 17 are views that explain processing of a data transmission using the short address in the present embodiments. It is assumed that FIG. 12 illustrates a state in which the route construction using the HELLO frame of the GW and the nodes A to C using a normally used arbitrary address has been completed.

The GW allocates to each of the nodes a short address of, for example, 16-bits. This GW sets ON in the route construction flag of the HELLO frame to be transmitted, imparts the short address of the GW (e.g., it is assumed that the short address=10), and transmits the HELLO frame (1). Each of the nodes A to C is in a state at which the short address has not been acquired and at which the route construction flag is OFF for all of the LDs in the routing table 35. In this case, each of the nodes A to C turns the route construction flag of the HELLO frame OFF and transmits the HELLO frame. At this time, since each of the nodes A to C does not hold a short address, "0" (an invalid value) is set in the "short address" of the HELLO frames (2), (3), and (4) that are transmitted from the nodes A to C.

The node A, when receiving the HELLO frame (1) from the GW, updates the route construction flag of the LD 1 (=the GW) of its own routing table to ON.

Figure 13:
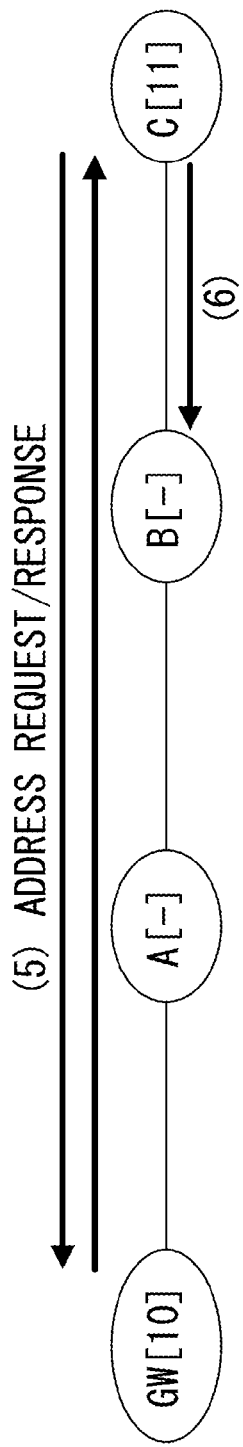
FIG. 13 is a view (No. 2) that explains processing of a data transmission by using a short address in the present embodiments.

Then, as illustrated in FIG. 13, the node C transmits an address request (5) for making a request to the GW for its own short address and receives an address response from the GW. With this, the node C may acquire its own short address (=11).

The node C, when acquiring the short address, judges that the route has not been constructed using the short address to the GW, since all of the route construction flags of the LD1 to LD3 in the routing table are OFF. In this case, the node C transmits the route construction flag in an OFF state that is set in the HELLO frame (6) to be transmitted. However, the node C imparts its own short address to the HELLO frame, since it has acquired its own short address.

Figure 14:
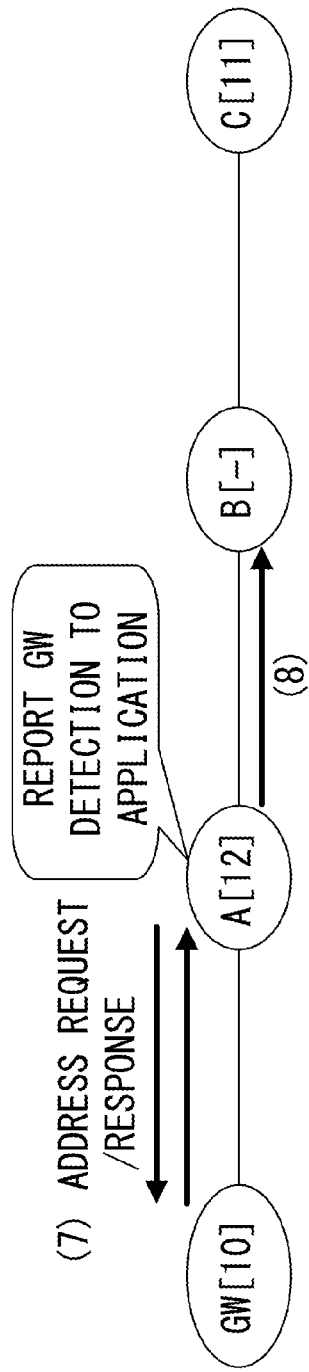
FIG. 14 is a view (No. 3) that explains processing of a data transmission by using a short address in the present embodiments.

Subsequent to the node C, the node A, as illustrated in FIG. 14, acquires the short address (=12) from the GW, using the address registration request/response (7) for the GW.

The node A, when acquiring the short address, judges that the route has been constructed using the short address to the GW, since the route construction flag of the LD1 (=the GW) in the routing table has already been ON. In this case, the node A reports to the application 28 in the node A that the GW has been detected.

The node A imparts its own short address to the HELLO frame (8) to be transmitted subsequently and transmits the route construction flag in the ON state.

The node B receives the HELLO frame (8) in which the route construction flag that is transmitted by the node A is ON. Then, the node B turns the route construction flag of the node A that is LD1 of its own routing table ON.

Figure 15:
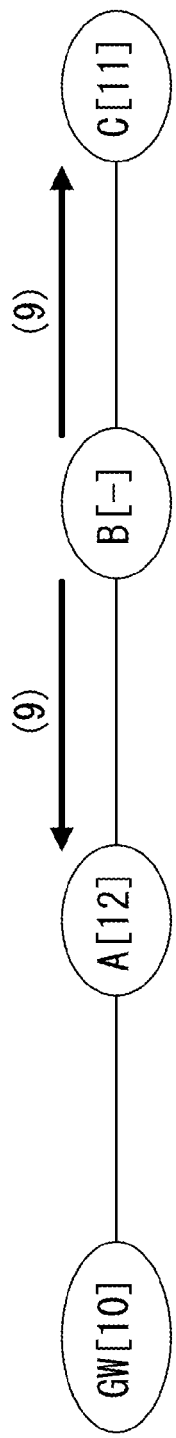
FIG. 15 is a view (No. 4) that explains processing of a data transmission by using a short address in the present embodiments.

The node B may judge that the route construction has been completed using the short address to the GW, since the route construction flag of the LD1 (=A) in the routing table is ON. However, since the node B has not acquired its own short address, as illustrated in FIG. 15, it transmits the route construction flag, in an OFF state, of the HELLO frame (9)

transmitted by the node B. Further, since the node B does not hold its own short address, it sets 0 (an invalid value) in the short address of the HELLO frame (9).

Figure 16:
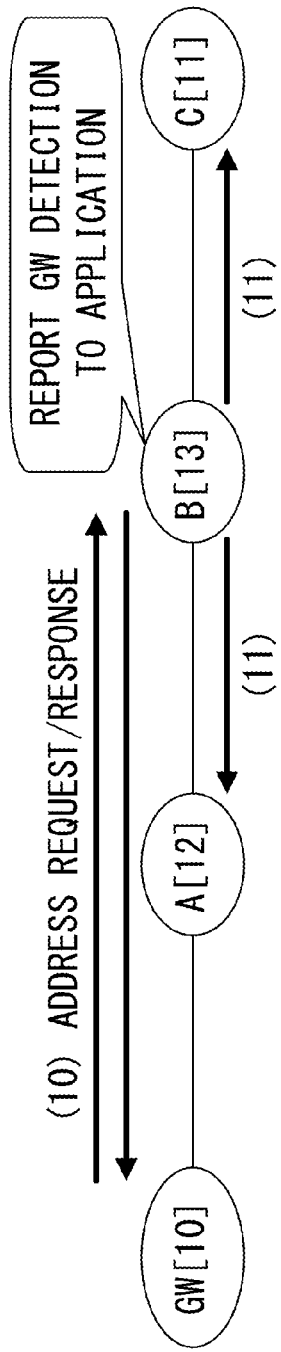
FIG. 16 is a view (No. 5) that explains processing of a data transmission by using a short address in the present embodiments.

Next, as illustrated in FIG. 16, the node B acquires from the GW its own short address (=13) using the address request/response (10) for the GW. The node B, when acquiring the short address, judges that the route construction has been completed using the short address to the GW, since the route construction flag of the LD1 (=A) in the routing table is ON, and reports to the application 28 in the node B that the GW has been detected.

The node B sets its own short address in the HELLO frame (11) to be transmitted subsequently and transmits the HELLO frame with its route construction flag ON.

The nodes A and C, when receiving the HELLO frame in which the route construction flag is ON from the node B, make the route construction flag ON that corresponds to the entry in which the node B is registered as the LD in its own routing table.

Figure 17:
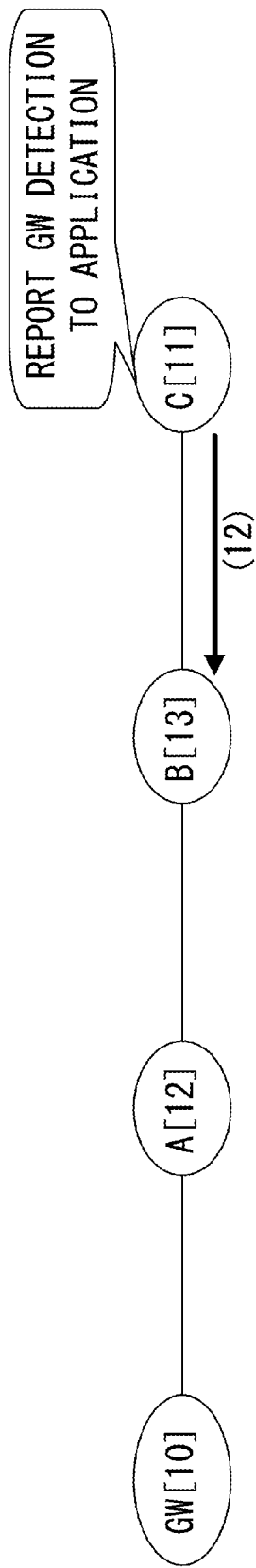
FIG. 17 is a view (No. 6) that explains processing of a data transmission by using a short address in the present embodiments.

The node C judges that the route has been constructed using the short address to the GW, since one or more route construction flags have the ON node in one or more of the LDs in the routing table, as illustrated in FIG. 17, and reports to the application 28 in the node C that the GW has been detected. The route construction flag of the HELLO frame (12) to be transmitted subsequently by the node C becomes ON.

Thus, by installing and propagating the flag for deciding whether or not the route has been constructed using the short address in the HELLO frame, whether or not the route to the final destination (GW) has been constructed using the short address may be judged. Since the detection of the GW may be reported to the application 28 after the route has been constructed using the short address, a data transmission to the destination at which the route has not been constructed may be deterred at a transmission source, and traffic may be reduced.

Figure 18:
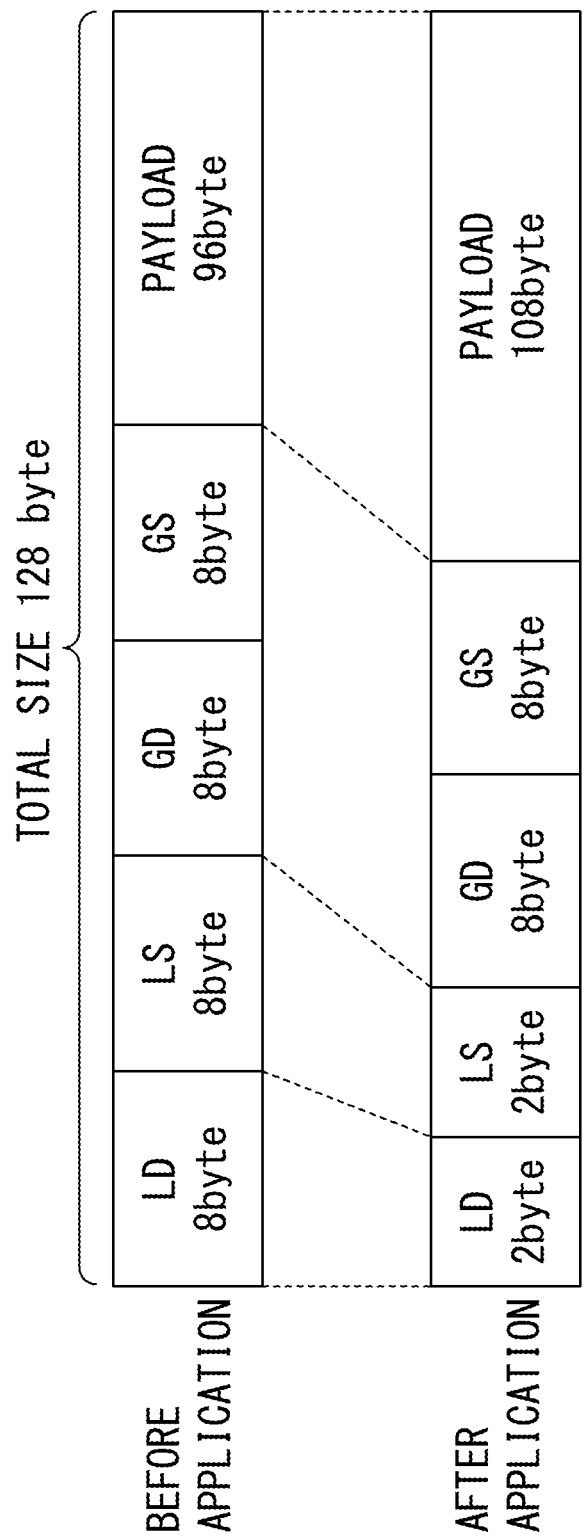
FIG. 18 is a view that explains a data frame before applying the present embodiments and a data frame after applying the present embodiments.

FIG. 18 is a view that explains a data frame before applying the present embodiments and a data frame after applying the present embodiments. In the data frame to be transmitted, a short address is used instead of the address with a normally used size. With this, in the data frame, more payload areas that may be used in the higher rank application may be secured and the network traffic may be reduced.

For example, it is assumed that the size of the LD, LS, GD, and GS of the normally used data frame is 8 [Bytes], that the size of the payload is 96 [Bytes], and that a total frame length is 128 [Bytes] at a maximum. When the short address (the 16-bit address) is used for the LD and LS, a payload size of 108 [Bytes] may be secured. In this case, a ratio of the payload size before and after applying the present embodiments is as follows.

Before application: 96/128=75.0%
After application: 108/128=84.4%

Accordingly, with the present embodiments, the ratio of the payload size increases by 84.4−75.0=9.4%.

Further, by performing the GW detection after constructing the route that uses the short address, the data is transmitted in a state at which the route to the final destination has been constructed. Accordingly, useless traffic may be inhibited in a section of a wireless line.

As mentioned above, the GW imparts the route construction flag in which its own short address and ON are set in the HELLO frame, and transmits the HELLO frame. The node apparatus that receives the HELLO frame turns the route construction flag of the corresponding LD ON in its own routing table, and together with this, confirms whether or not its own short address is allocated. When the node's own short address is not allocated, the node apparatus makes a short address request to the GW and acquires its own short address from the GW. When the node's own short address is allocated, the node apparatus imparts its own short address and the route construction flag=ON to the HELLO frame and transmits the HELLO frame.

The node apparatus that has received the HELLO frame (in which ON is set in the route construction flag) from the adjacent node apparatus performs the following processing. Namely, the node apparatus turns the route construction flag of the corresponding LD ON in its own routing table, and together with this, confirms whether or not its own short address is allocated. When the node apparatus's own short address is not allocated, the node apparatus makes a short address request to the GW and acquires its own short address of from the GW. When the node apparatus's own short address is allocated, the node apparatus imparts its own short address and the route construction flag=ON to the HELLO frame and transmits the HELLO frame. At this time, the node apparatus may communicate using the data frame, when the route construction flag of any of the LDs to the GW is ON.

Although explanations have been given for a case in which the GD is the GW in the present embodiments, the embodiments are not limited to this, and any node apparatus may be used as long as it is the apparatus that is registered in the GD in the routing table.

Hereinafter, explanations are given for examples according to the present embodiments.

EXAMPLE 1

Figure 19:
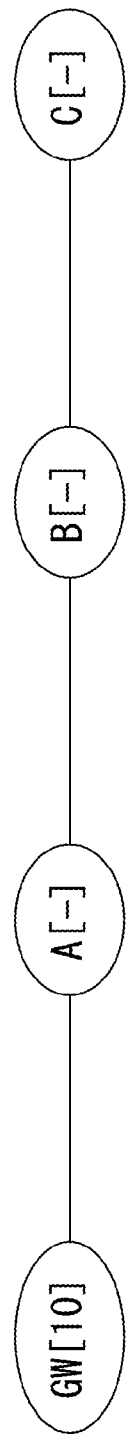
FIG. 19 illustrates a routing table of each of the nodes when a network is constructed using a transmission and reception of a HELLO frame in the present embodiments (Example 1).

FIG. 19 to FIG. 24 are views that explain an example when nodes A, B, C in the present embodiment (Example 1) sequentially make an address request for a short address. FIG. 19 illustrates a routing table of each of the nodes when the network is constructed using a transmission and reception of the HELLO frame. In reference to FIG. 19 to FIG. 24, explanations are given for a flow up to the point at which the node A completes the route construction using the short address.

In FIG. 20, the GW sets its own short address and a route construction flag=ON in a HELLO frame and transmits the HELLO frame (S1).

The node A, when receiving the HELLO frame transmitted from the GW, updates the route construction flag of the LD1(=the GW) of the routing table addressed to the GW to ON (S2).

Since the node A has not acquired the short address, in order to acquire the short address, the node A makes an address request for the short address to the GW (S3). The GW, upon receipt of the address request from the node A, transmits the address response addressed to the node A (S4). The node A receives the address response from the GW, and acquires the short address that is included in the address response. The node A holds the acquired short address in the storage unit (S5).

The node A judges that the route construction using the short address to the GW has been completed, since one or more of the route construction flags of the LD of its own routing table addressed to GW are ON and the short address has been stored. In this case, the node A reports to the application 28 in the node A that the GW has been detected, as illustrated in FIG. 21 (S6).

The node A imparts the short address to the HELLO frame that is transmitted subsequently and transmits the HELLO frame with the route construction flag ON (S7).

Figure 22:
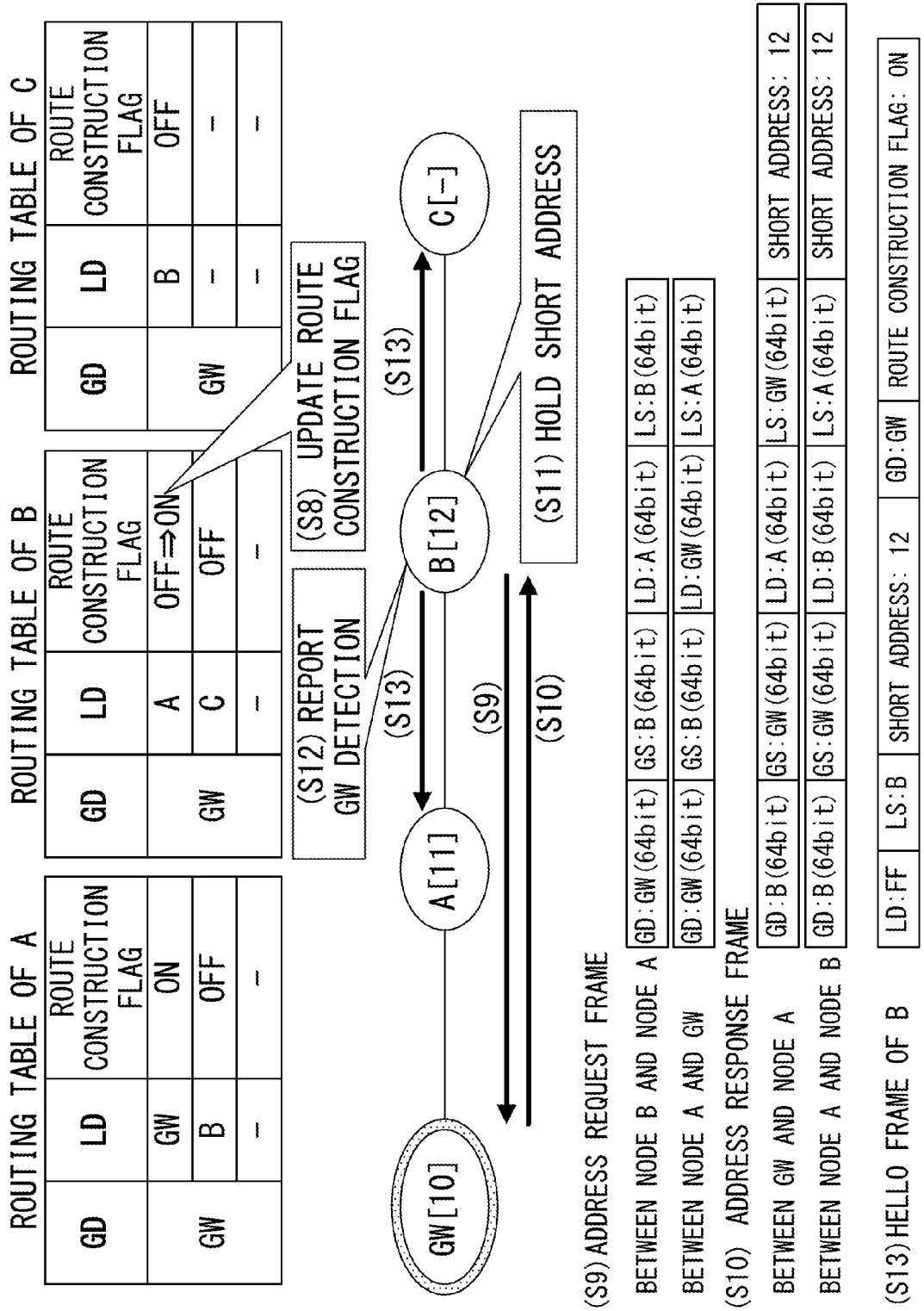
FIG. 22 is a view (No. 3) that explains an example when nodes A, B, and C in the present embodiments (Example 1) sequentially make an address request for a short address.

Next, in reference to FIG. 22, explanations are given for a flow up to the point at which the node B completes the route construction using the short address, similarly to the node A.

The node B, upon receipt of the HELLO frame that was received by the node A in S7, turns the route construction flag of the LD1 (=A) of its own routing table addressed to GW ON (S8).

Since the node B has not acquired the short address, in order to acquire the short address, it makes an address request for the short address to the GW (S9). The GW, upon receipt of the address request from the node B, transmits the address response addressed to the node B (S10).

The node B receives the address response from the GW, and acquires the short address that is included in the address response. The node B holds the acquired short address in the storage unit (S11).

The node B judges that the route construction using the short address to the GW has been completed, since one or more of the route construction flags of the LD of its own routing table addressed to GW are ON and the short address has been stored. In this case, the node B reports to the application 28 in the node B that the GW has been detected (S12).

The node B imparts the short address to the HELLO frame that is transmitted subsequently and transmits the HELLO frame with the route construction flag ON (S13).

Figure 24:
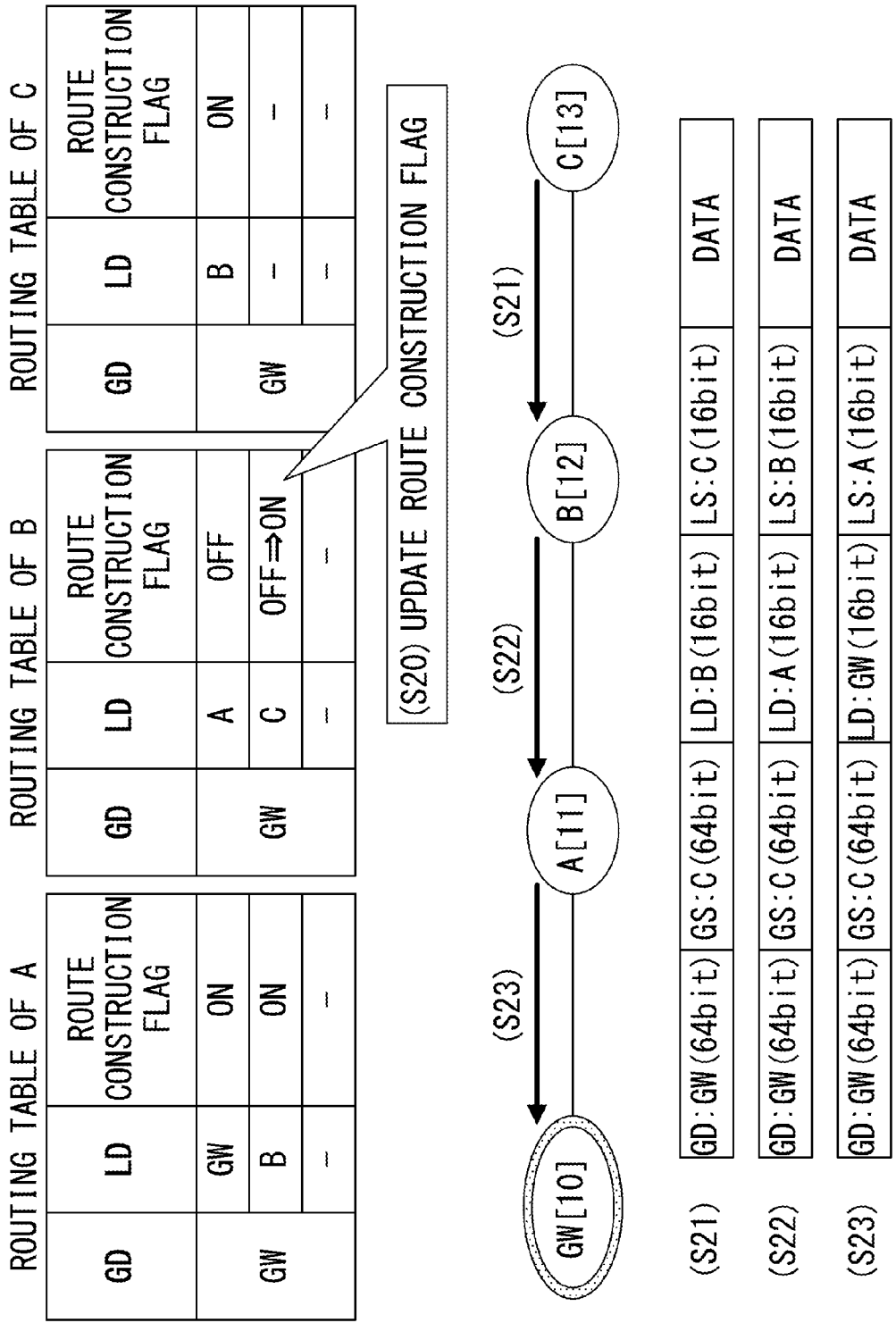
FIG. 24 is a view (No. 5) that explains an example when nodes A, B, and C in the present embodiments (Example 1) sequentially make an address request for a short address.

Next, in reference to FIG. 23 and FIG. 24, explanations are given for a flow up to the point at which the node C completes the route construction using the short address, similarly to the nodes A and B.

The node C, upon receipt of the HELLO frame transmitted by the node B in S13, turns the route construction flag of the LD1 (=B) of its own routing table addressed to GW ON (S14). The node A further turns the route construction flag of the LD2 (=B) of its own routing table addressed to GW ON (S14).

Since the node C has not acquired the short address, in order to acquire the short address, it makes an address request for the short address to the GW (S15). The GW, upon receipt of the address request from the node C, transmits the address response to the node C (S16).

The node C receives the address response, and acquires the short address that is included in the address response. The node C holds the acquired short address in the storage unit (S17).

The node C judges that the route construction using the short address to the GW has been completed, since one or more of the route construction flags of the LD of its own routing table addressed to GW are ON and the short address has been stored. In this case, the node C reports to the application 28 in the node C that the GW has been detected (S18).

The node C imparts the short address to the HELLO frame that is transmitted subsequently and transmits the HELLO frame with the route construction flag ON (S19).

The node B, upon receipt of the HELLO frame transmitted from the node C in S19, turns the route construction flag of the LD2 (=C) of its own routing table addressed to GW ON (S20).

In a state of S20, the node C transmits the data frame to the GW. At this time, the node C transmits the data frame by using the short address for the node B that is the LD1 of the routing table addressed to the GW (S21).

The node B transfers the data frame to the GW (S22). At this time, the node B transfers the data frame by using the short address to the node A that is the LD1 of the routing table addressed to the GW (S22).

The node A transfers the data frame to the GW. At this time, the node A transfers the data frame by using the short address to the GW that is the LD1 of the routing table addressed to the GW (S23).

EXAMPLE 2

In Example 2, explanations are given for an example in which nodes C, A, B sequentially make an address request for the short address, and in which each of the nodes completes the route construction using the short address.

Figure 25:
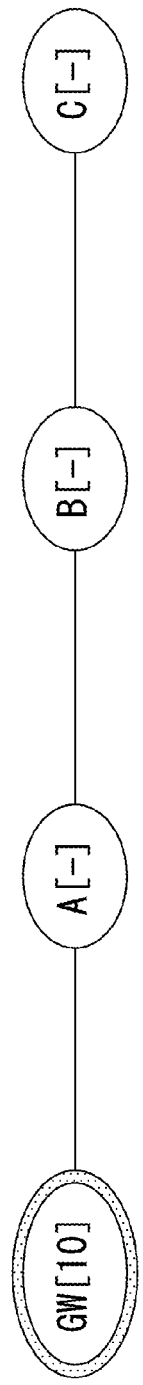
FIG. 25 illustrates a routing table of each of the nodes when a network is constructed using a transmission and reception of a HELLO frame in the present embodiments (Example 2).

FIG. 25 illustrates the routing table of each of the nodes when the network is constructed using a transmission and reception of the HELLO frame. In reference to FIG. 25 to FIG. 30, explanations are given for a flow through which the node C acquires the short address.

As illustrated in FIG. 26, the GW sets its own short address and the route construction flag=ON in the HELLO frame and transmits the HELLO frame (S31).

The node A, upon receipt of the HELLO frame transmitted in S31, updates the route construction flag of the LD1(=the GW) of the routing table addressed to the GW to ON (S32).

Since the node C has not acquired the short address, in order to acquire the short address, the node C makes an address request for the short address to the GW (S33). The GW, upon receipt of the address request from the node C, transmits the address response to the node C (S34).

The node C receives the address response from the GW, and acquires the short address that is included in the address response. The node C holds the acquired short address in the storage unit (S35).

Since the node C has held the short address in S35, it imparts the short address to the HELLO frame that is transmitted subsequently and transmits the HELLO frame (S36). In the node C, however, since any of the route construction flags of the LD of the routing table addressed to the GW are OFF, it is in a state at which the route has not been constructed using the short address to the GW. Therefore, at this time, the node C does not report to the application 28 in the node C that the GW has been detected and also the route construction flags of the HELLO frame transmitted by the node C remain OFF.

Figure 27:
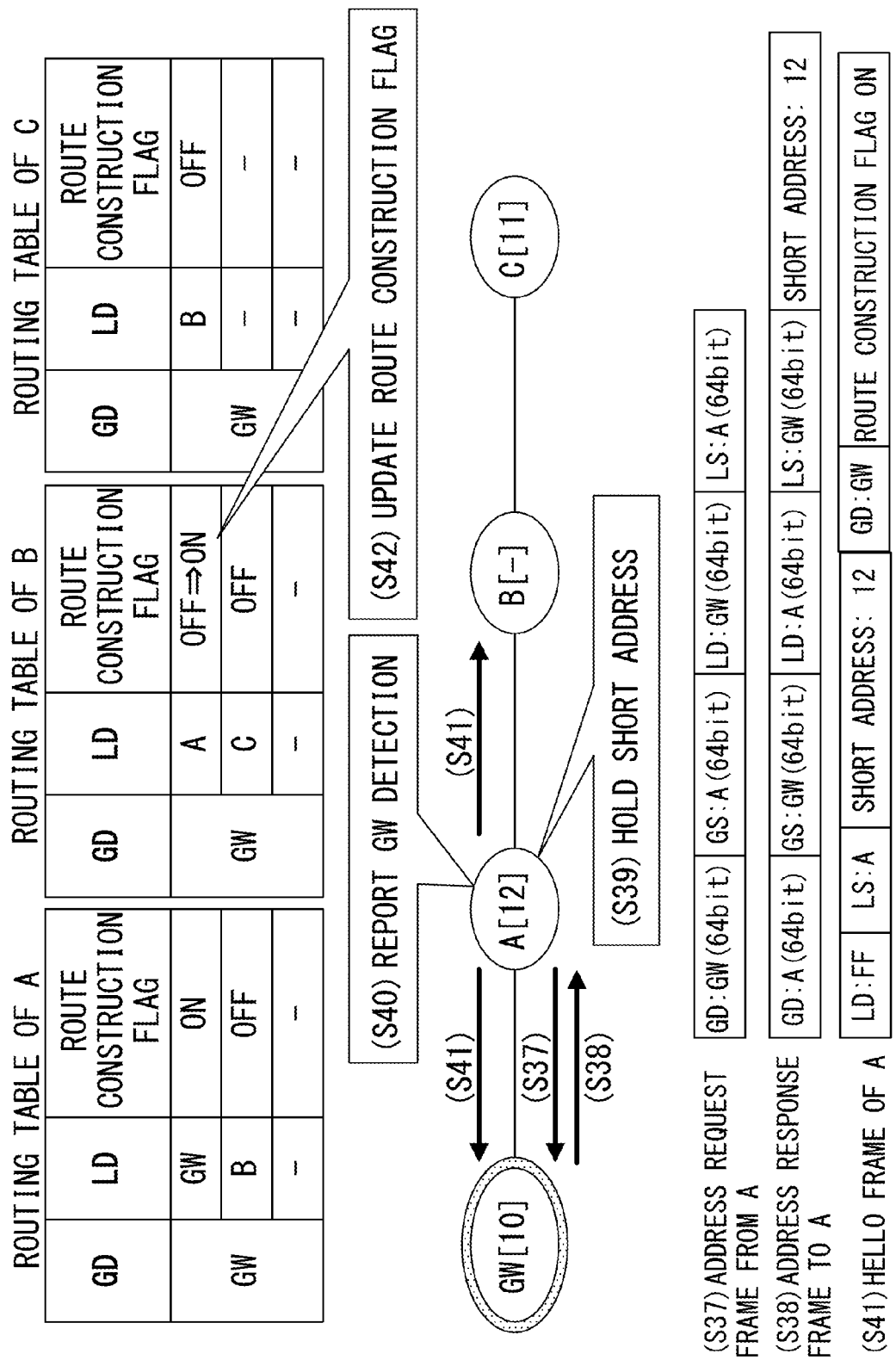
FIG. 27 is a view (No. 2) that explains an example when nodes C, A, and B in the present embodiments (Example 2) sequentially make an address request for a short address and when each of the nodes has completed a route construction using a short address.

Next, in reference to FIG. 27, explanations are given for a flow through which the node A completes the route construction using the short address. Since the node A has not acquired the short address, in order to acquire the short address, the node A makes an address request for the short address to the GW (S37). The GW, upon receipt of the address request from the node A, transmits the address response to the node A (S38).

The node A receives the address response from the GW, and acquires the short address that is included in the address response. The node A holds the acquired short address in the storage unit (S39).

The node A judges, from S32, that the route construction using the short address to the GW has been completed, since one or more of the route construction flags of the LD of its own routing table addressed to GW are ON and the short address has been stored. In this case, the node A reports to the application 28 in the node A that the GW has been detected (S40).

The node A imparts the short address to the HELLO frame that is transmitted subsequently and transmits the HELLO frame with the route construction flag ON (S41).

The node B, upon receipt of the HELLO frame transmitted by the node A in S41, turns the route construction flag of the LD1 (=A) of its own routing table addressed to GW ON (S42).

Figure 29:
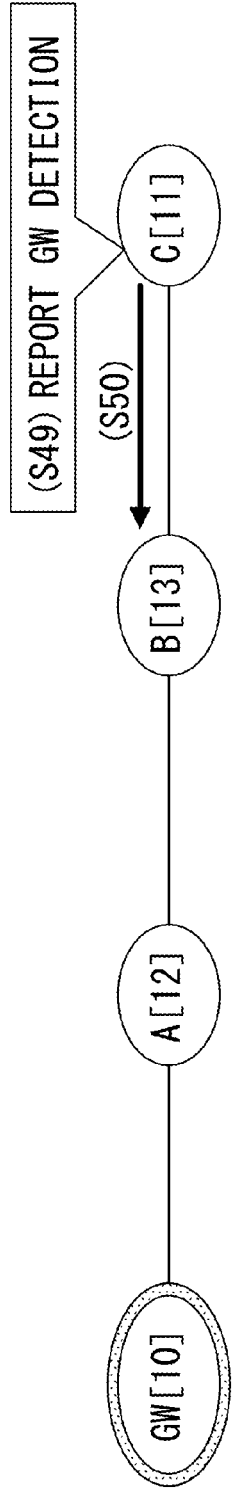
FIG. 29 is a view (No. 4) that explains an example when nodes C, A, and B in the present embodiments (Example 2) sequentially make an address request for a short address and when each of the nodes has completed a route construction using a short address.
Figure 30:
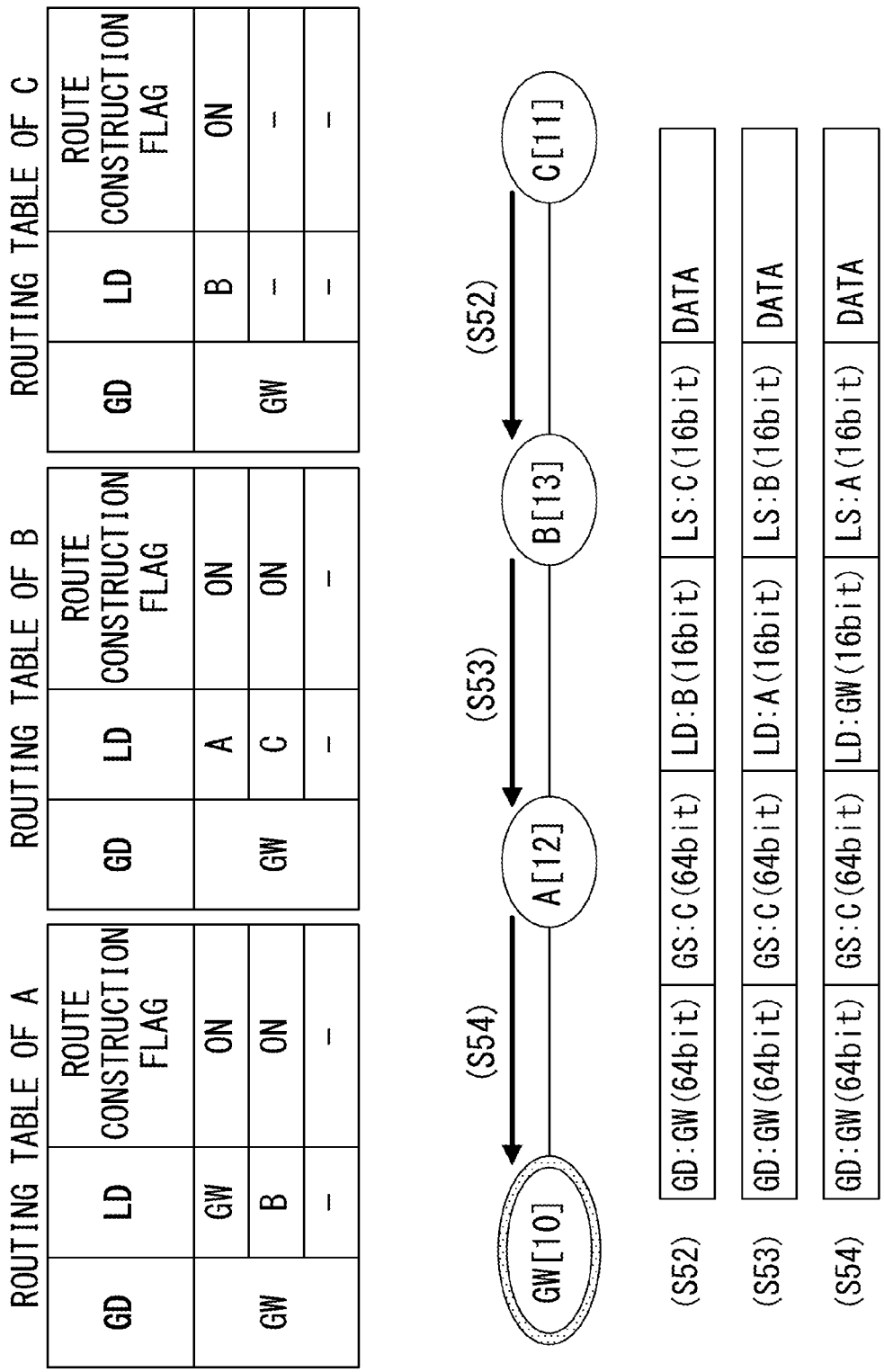
FIG. 30 is a view (No. 5) that explains an example when nodes C, A, and B in the present embodiments (Example 2) sequentially make an address request for a short address and when each of the nodes has completed a route construction using a short address.

Next, in reference to FIG. 28 to FIG. 30, explanations are given for a flow through which the node B similarly completes the route construction using the short address. As illustrated in FIG. 28, since the node B has not acquired the short address, in order to acquire the short address, the node B makes an address request for the GW (S43). The GW, upon receipt of the address request from the node B, transmits the address response to the node C (S44).

The node B receives the address response from the GW, and acquires the short address that is included in the address response. The node A holds the acquired short address in the storage unit (S45).

The node B judges that the route using the short address to the GW has been constructed, since one or more of the route construction flags of the LD of its own routing table addressed to GW are ON and the short address has been stored. In this case, the node B reports to the application 28 in the node B that the GW has been detected (S46).

The node B imparts the short address to the HELLO frame that has been transmitted subsequently and transmits the HELLO frame with the route construction flag ON (S47).

The nodes C and A receive the HELLO frame transmitted by the node B in S47. Then, the node C turns the route construction flag of the LD1 (=B) of its own routing table addressed to GW ON. The node A further turns the route construction flag of the LD2 (=B) of its own routing table addressed to GW ON (S48).

The node C judges that the route construction using the short address to the GW has been completed, since one or more of the route construction flags of the LD of its own routing table addressed to GW are ON from S48 and the short address has been stored. In this case, as illustrated in FIG. 29, the node C reports to the application 28 that the GW has been detected (S49).

The node C transmits the HELLO frame that is transmitted subsequently with the route construction flag ON (S50).

The node B, upon receipt of the HELLO frame in S50, turns the route construction flag of the LD2 (=C) of its own routing table addressed to the GW ON (S51).

In a state of S51, the node C transmits the data frame to the GW. At this time, as illustrated in FIG. 30, the node C transmits the data frame by using the short address to the node B that is the LD1 of its own routing table addressed to the GW (S52).

The node B transfers the data frame to the GW. In this case, the node B transfers the data frame by using the short address to the node A that is the LD1 of its own routing table addressed to the GW (S53).

The node A transfers the data frame to the GW. In this case, the node A transfers the data frame by using the short address to the GW that is the LD1 of its own routing table addressed to the GW (S54).

EXAMPLE 3-1

In Example 3-1, explanations are given for an example of transmitting data to the final destination (the GD) by switching the route when a node in which the route is constructed using the short address has been rebooted and the short address that was held has been erased. In Example 3-1, the rebooted node transmits the data frame in a state at which the HELLO frame with the route construction flag OFF has not been transmitted.

Figure 32:
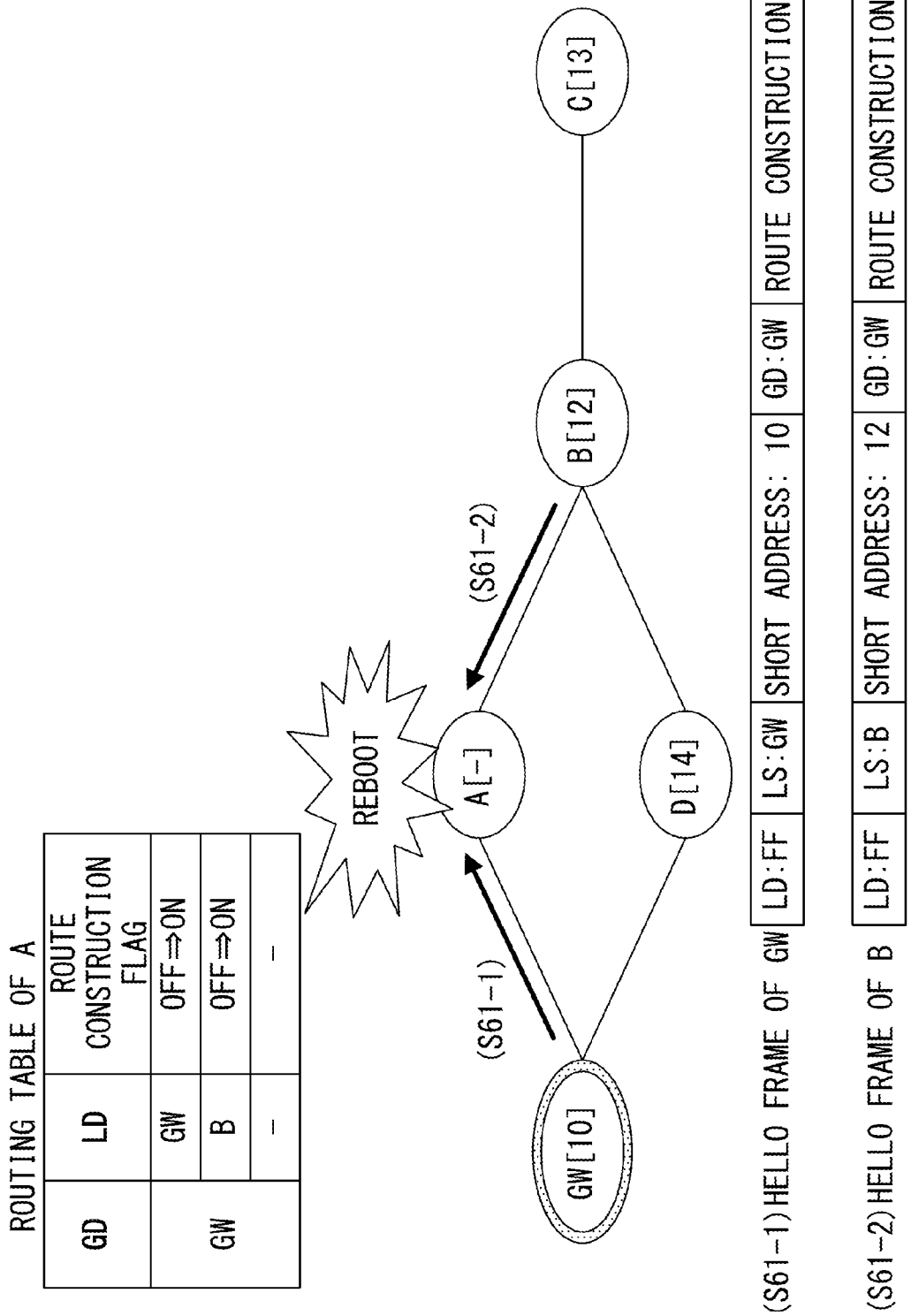
FIG. 32 is a view (No. 1) that explains a data transmission when a node rebooting has occurred in a network in which the route construction has been completed using a short address in the present embodiments (Example 3-1).

FIG. 31 illustrates a network in which a route construction has been completed using the short address and the routing table of each of the nodes. FIG. 32 illustrates a state in which the node A has been rebooted, and after that, a route construction using the HELLO frame is completed by receiving the HELLO frame transmitted from peripheral nodes. It is assumed that when the node A has been rebooted, the node A's own short address has been erased.

The rebooted node A receives the HELLO frame transmitted by the adjacent GW and node B (S61-1, S61-2), and registers information based on the received HELLO frame in the routing table. Since the route construction flag of the HELLO frame that is received is ON, the node A updates the route flags of the LD1 (=GW) and LD2 (=B) of its own routing table addressed to the GW to ON. However, since the node A does not have the short address, the route construction using the short address has not been completed.

Figure 33:
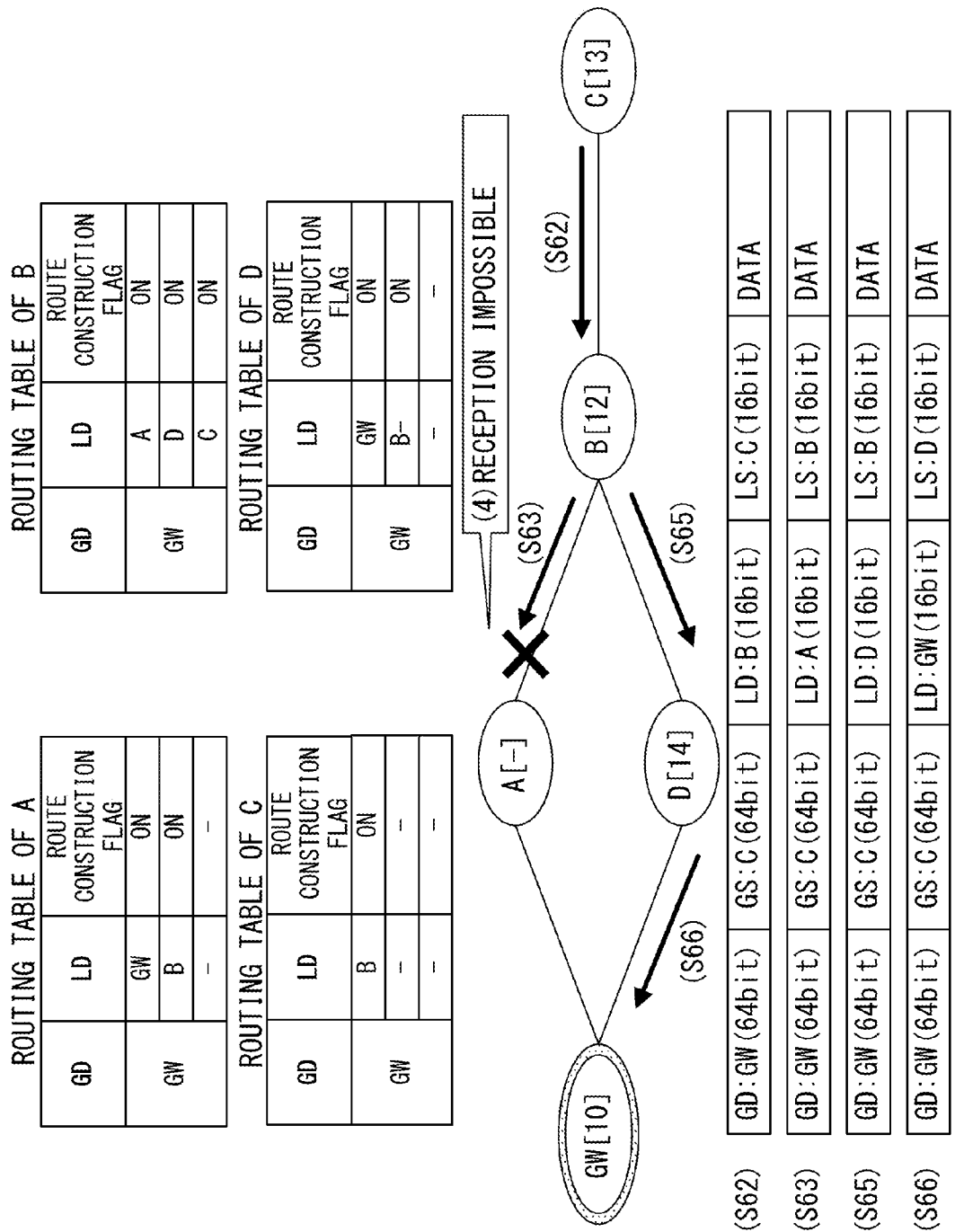
FIG. 33 is a view (No. 2) that explains a data transmission when a node rebooting has occurred in a network in which the route construction has been completed using a short address in the present embodiments (Example 3-1).

As illustrated in FIG. 33, in the states of S61-1 and S61-2, the node C transmits the data frame to the GW by using the short address (S62). At this time, the node C transmits the data frame making the node B that is the LD1 of its own routing table addressed to the GW the LD.

The node B transfers the data frame to the GW. At this time, since the node B has completed the route construction using the short address, the node B transfers the data frame making the node A that is the LD1 of its own routing table addressed to the GW the LD (S63). However, since the node A does not have its own short address, it does not receive the data frame by using the short address (S64).

Since the node B did not transfer the data frame through the node A, it switches the route and transfers the data frame to the node D that is the LD2 of its own routing table addressed to the GW (S65).

The node D transfers the data frame to the GW. At this time, the node D transfers the data frame making the GW that is the LD1 of its own routing table addressed to the GW the LD (S66).

As mentioned above, when transmitting the data frame from the node B to the node A that does not hold the short address, the node A does not receive the data frame and the data transmission from the node B to the node A fails. However, as the node B switches the route and transmits the data frame to the node D that is the LD2 in which the route construction has been completed using the short address, the data may reach the final destination.

EXAMPLE 3-2

In Example 3-2, explanations are given for an example of transmitting data to the final destination (the GD) by switching the route when a node in which the route is constructed using the short address has been rebooted and the short address that was stored has been erased. In Example 3-2, the rebooted node transmits the data frame in a state at which the HELLO frame with the route construction flag OFF has been transmitted.

Figure 34:
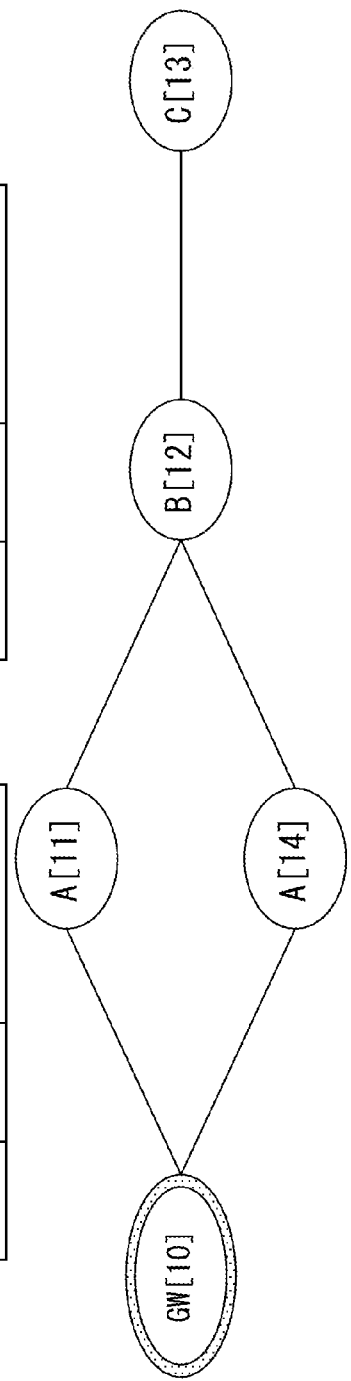
FIG. 34 illustrates a network in which a route construction has been completed using a short address and illustrates a routing table of each of the nodes in the present embodiments (Example 3-2).

FIG. 34 illustrates a network in which the route construction has been completed using the short address and the routing table of each of the nodes.

Figure 35:
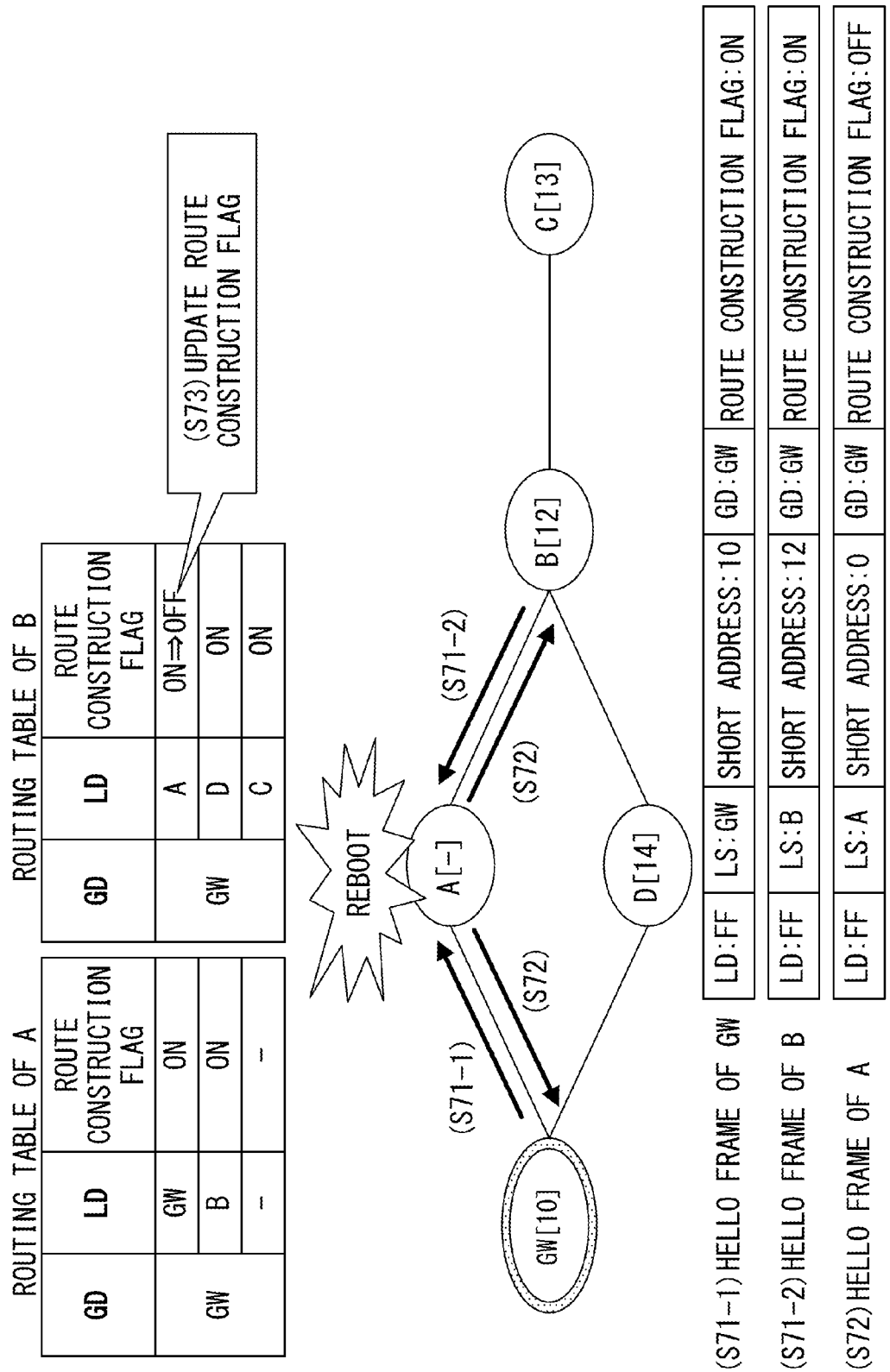
FIG. 35 is a view (No. 1) that explains a data transmission when a node rebooting has occurred in a network in which the route construction has been completed using a short address in the present embodiments (Example 3-2).
Figure 36:
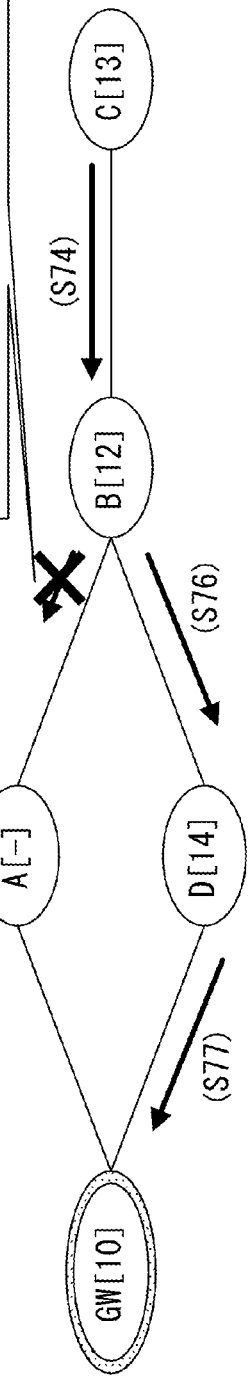
FIG. 36 is a view (No. 2) that explains a data transmission when a node rebooting has occurred in a network in which the route construction has been completed using a short address in the present embodiments (Example 3-2).

FIG. 35 to FIG. 36 illustrate a state in which the node A has been rebooted, and after that, a route construction using the HELLO frame is completed by receiving the HELLO frame transmitted from peripheral nodes. It is assumed that when the node A has been rebooted, the node A's own short address has been erased.

As illustrated in FIG. 35, the rebooted node A receives the HELLO frame transmitted by the adjacent GW and node B (S71-1, S71-2), and registers information based on the received HELLO frame in the routing table.

Since the route construction flag of the HELLO frame to be received is ON, the node A updates the route flags of the LD1 (=GW) and LD2 (=B) of its own routing table addressed to the GW to ON. However, since the node A does not have the short address, the route construction using the short address has not been completed.

The node A transmits the HELLO frame (S72). At this time, since the node A has not completed the route construction using the short address, the route construction flag of the HELLO frame to be transmitted is OFF.

The node B, when receiving the HELLO frame transmitted by the node A in S72, updates the route construction flag of the LD1(=A) of its own routing table addressed to the GW to OFF (S73) as the route construction flag of the HELLO frame is OFF.

As illustrated in FIG. 36, the node C transmits the data frame to the GW by using the short address in a state of S73. At this time, the node C transmits the data frame making the node B that is the LD1 of its own routing table addressed to the GW the LD (S74).

The node B transfers the data frame to the GW. At this time, the node B selects the node A that is the LD1 of its own routing table addressed to the GW as the LD, since the route construction using the short address has been completed. However, the node B judges that the route using the short address has not been constructed since the route construction flag of the LD1 is OFF. As a result, the data frame is not transmitted via the node A (S75).

Since the node B does not transmit the data frame to the node A that is the LD1, the node B switches the route to transfer the data frame. At this time, the node B transmits the data frame to the node D that is the LD2 of its own routing table addressed to the GW (S76).

The node D transmits the data frame to the GW. At this time, the node D transmits the data frame making the GW that is the LD1 of its own routing table addressed to the GW the LD (S77).

As mentioned above, since the node B does not transmit the data to the node A in which the route construction flag OFF is set in the node B's own routing table by using the short address, the data transmission through the node A fails. However, since the node B switches the route and transmits the data frame to the node D of the LD2 in which the route construction has been completed using the short address, the data may reach the final destination.

EXAMPLE 4

In Example 4, explanations are given for an example of transmitting data to another GW that performs an external network connection such as a server by switching the route using anode of a data transmission source when a transmission node does not hold the short address, due to, for example, rebooting and the like.

Figure 37:
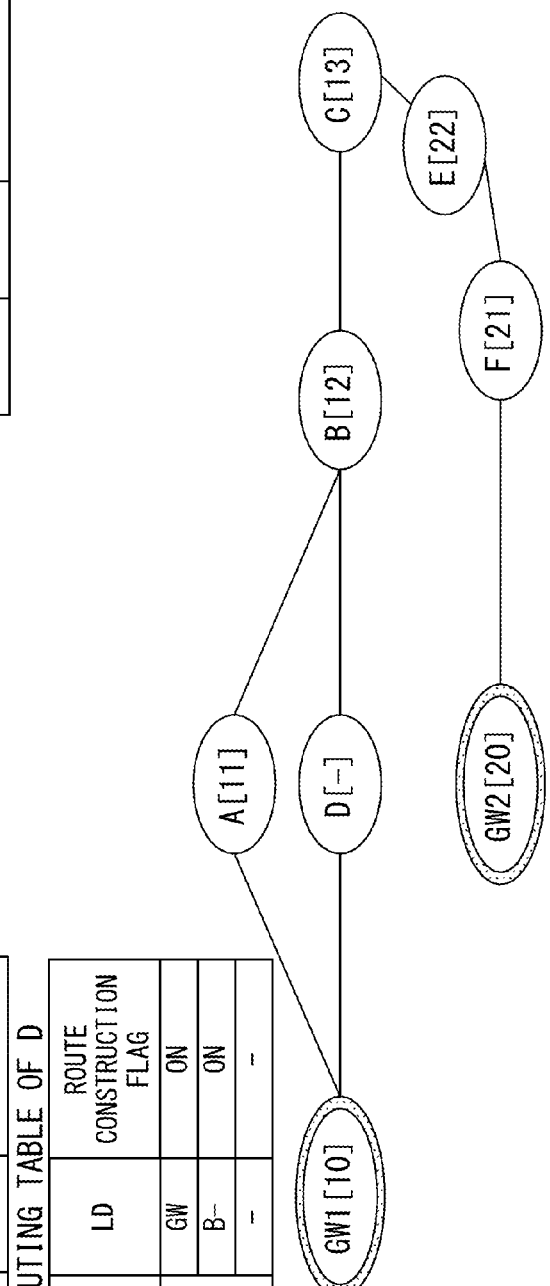
FIG. 37 illustrates a network in which a route construction has been completed using a short address and a routing table of each of the nodes in the present embodiments (Example 4).

FIG. 37 illustrates a network in which a route construction has been completed using the short address and a routing table of each of the nodes in the present embodiments (Example 4). In the node C, the GW 1 is set as a first candidate for the GW that performs an external network connection such as a server, and the GW 2 is set as a second candidate.

Figure 38:
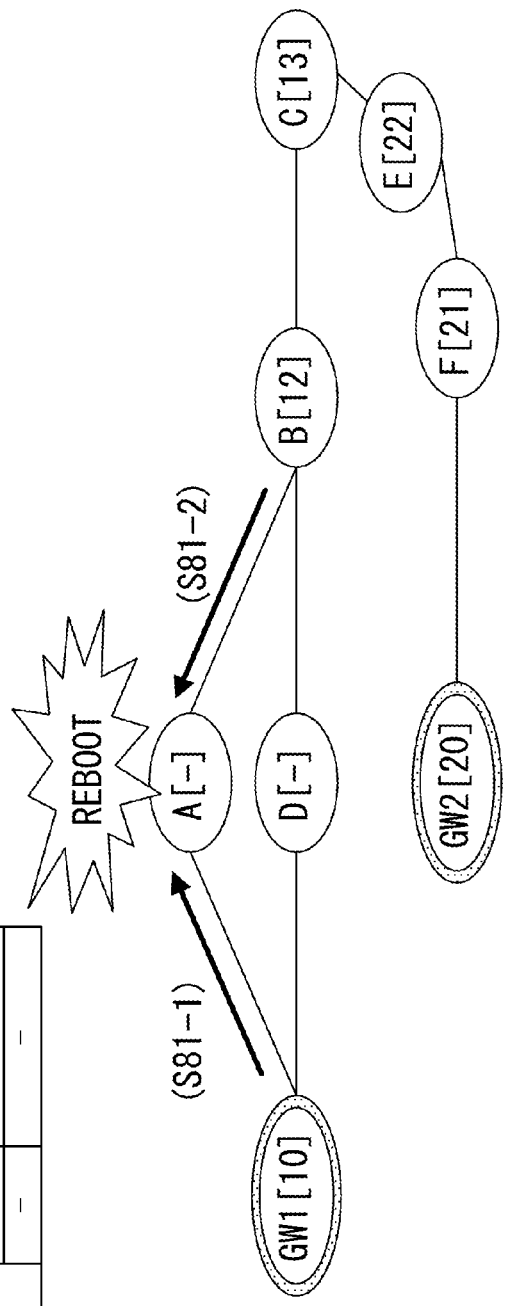
FIG. 38 is a view (No. 1) that explains a data transmission when a node rebooting has occurred in a network in which the route construction has been completed using a short address in the present embodiments (Example 4).
Figure 39:
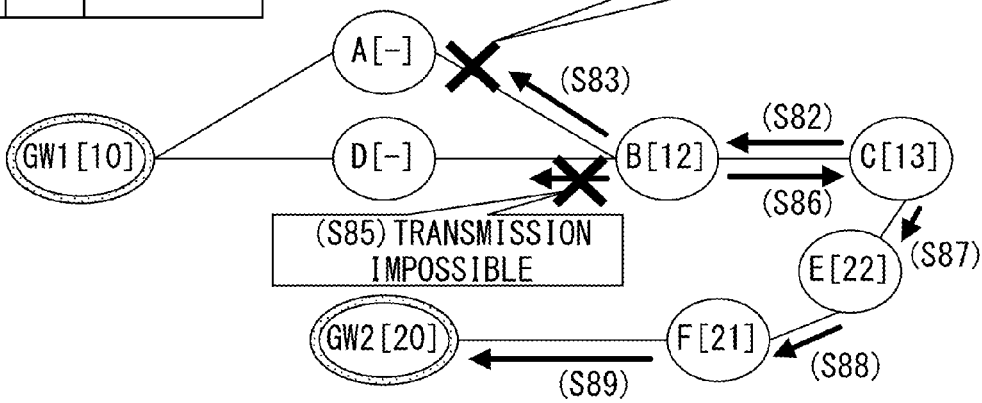
FIG. 39 is a view (No. 2) that explains a data transmission when a node rebooting has occurred in a network in which the route construction has been completed using a short address in the present embodiments (Example 4).

FIG. 38 and FIG. 39 illustrate a state in which the node A has been rebooted, and after that, a route construction using the HELLO frame is completed by receiving the HELLO frame transmitted from peripheral nodes and data transmission is performed. It is assumed that when the node A has been rebooted, the node A's own short address has been erased. Further, the node D at this time has not completed the route construction using the short address since it does not have the short address.

As illustrated in FIG. 38, similar to Example 3-1, the rebooted node A receives the HELLO frame transmitted by the adjacent GW and node B (S81-1, S81-2), and registers information based on the received HELLO frame in the routing table. Since the route construction flag of the HELLO frame that is received at this time is ON, the node A updates the route flags of the LD1 (=GW) and LD2 (=B) of its own routing table addressed to the GW to ON. However, since the node A does not have the short address, the route construction using the short address has not been completed.

As illustrated in FIG. 39, the node C transmits the data frame to the GW1 that is a first candidate for the GW that performs an external network connection such as a server. At this time, the node C, by using the short address, transmits the data frame to the node B that is the LD1 of its own routing table addressed to the GW1 (S82).

The node B transfers the data frame to the GW1. At this time, the node B, by using the short address, transfers the data frame to the node A that is the LD1 of its own routing table addressed to the GW1 (S83). However, since the node A does not have its own short address, it does not receive the data frame that uses the short address (S84).

Since the node B did not transfer the data frame through the node A, it tries to switch a route and change the route to the node D that is the LD2 of the routing table addressed to the GW. However, since the node D has not constructed the route using the short address, it does not transmit the data frame (S85). The node B, since the transfer of the data frame through the node D is not available, returns the data frame to the node C that is the local transmission source (LS) of the data frame (S86).

Since there is no address of its own routing table addressed to the GW1, the node C judges that the data transmission to the first candidate GW1 has failed. Then, the node C changes the address to the second candidate GW2 to transmit the data frame to the node E by using the short address (S87).

The node E transfers the data frame to the GW2. At this time, the node E transfers the data frame by using the short address to the node F that is the LD1 of its own routing table addressed to the GW2 (S88).

The node F transfers the data frame to the GW2. At this time, the node F transfers the data frame by using the short address to the GW2 that is the LD1 of its own routing table addressed to the GW2 (S89).

Figure 40:
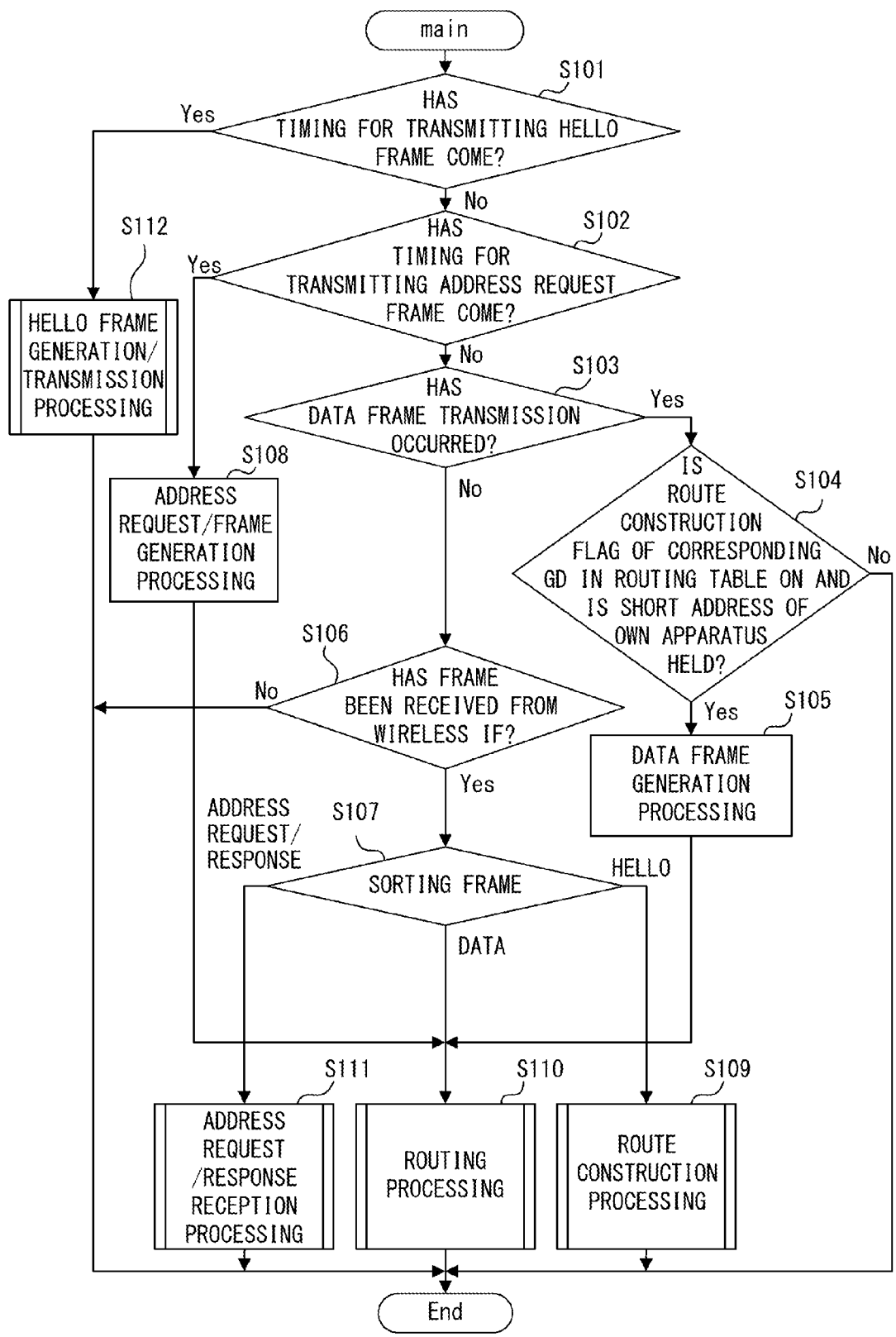
FIG. 40 illustrates a flow of overall processing of a communication apparatus in the present embodiments (Examples 1 to 4).

FIG. 40 illustrates a flow of overall processing of a communication apparatus in the present embodiments (Examples 1 to 4). As mentioned above, the communication apparatus that performs processing of FIG. 40 is a component of the ad hoc network of the present embodiment and is communication apparatus to which the wireless ad hoc communication technology is installed. Examples of the communication apparatus include apparatus such as the node 11, the GW12, and the like.

The control unit 21 of the communication apparatus 20 reads out the program that is stored in the storage unit 34 and the like, and performs HELLO control processing 22, frame transmission processing 23, frame reception processing 24, route construction processing 25, routing processing 26, and address request/response processing 27. Specifically, the control unit 21 performs the processing of FIG. 40.

The control unit 21 decides whether or not a timing for transmitting the HELLO frame has come (S101). When the timing for transmitting the HELLO frame has come ("YES" in S101), the control unit 21 performs processing of generating and transmitting the HELLO frame (S112). Explanations for the details of S112 are given in FIG. 41.

When the timing for transmitting the HELLO frame has not come ("NO" in S101), the control unit 21 decides whether or not a timing for transmitting the address request frame has come (S102). When the timing for transmitting the address request frame has come ("YES" in S102), the control unit 21 generates the address request frame to the GW (S108) and proceeds to processing of S110.

When the timing for transmitting the address request frame has not come ("NO" in S102), the control unit 21 decides whether or not a request to transmit the data frame by the application 28 has occurred in the target node owning the control unit 21 (S103).

In the target node owning the control unit 21, when a request to transmit the data frame has occurred ("YES" in S103), the control unit 21 decides whether or not a route construction flag of the corresponding GD is ON in the routing table and the short address for the target node has been stored (S104). When the route construction flag of the corresponding GD is not ON in the routing table or when the short address for the target node has not been held ("NO" in S104), this flow ends.

When the route construction flag of the corresponding GD is ON in the routing table or when the short address for the target node has been held ("YES" in S104), the control unit 21 generates a data frame from the application (S105) and performs the processing of S110.

In the target node, when the request to transmit the data frame has not occurred ("NO" in S103), the control unit 21 decides whether or not the frame has been received from the wireless I/F 31 (S106). When the frame has not been received from the wireless I/F 31 ("NO" in S106), this flow ends.

When the frame has been received from the wireless I/F 31 ("YES" in S106), the control unit 21 refers to the header information of the frame and sorts the received frame in accordance with a type (S107). When the received frame is the HELLO frame, the control unit 21 performs route construction processing (S109). Detailed explanations for S109 are given in FIG. 42.

When the received frame is the data frame, the control unit 21 performs routing processing (S110). Detailed explanations for S110 are given in FIG. 43.

When the received frame is the address request/response frame, the control unit 21 performs address request/response reception processing (S111). Detailed explanations for S111 are given in FIG. 44.

FIG. 41 illustrates a detailed flow of HELLO frame generation/transmission processing (S112) in the present embodiments (Examples 1 to 4). The HELLO frame generation/transmission processing (S112) corresponds to the HELLO control processing 22.

When the communication apparatus 20 is the GW 12 ("YES" in S112-1), the control unit 21 (the MPU 41 of the GW) sets its own 16-bit address in the short address field of the HELLO frame (S112-9). The control unit 21 sets ON in the route construction flag of the HELLO frame (S112-10), and performs processing of S112-11.

When the communication apparatus 20 is the node 11 ("NO" in S112-1), the control unit 21 (the MPU 51 of the node) decides whether or not the communication apparatus 20 has held its own short address in the storage unit 34 (S112-2). When the communication apparatus 20 has not held its own short address in the storage unit 34 ("NO" in S112-2), the control unit 21 sets "0" in the short address field of the HELLO frame (S112-3), and performs processing mentioned later.

When the communication apparatus 20 has held its own short address in the storage unit 34 ("YES" in S112-2), the control unit 21 sets a 16-bit address of the target apparatus owning the control unit 21 in the short address field of the HELLO frame (S112-4) and performs processing mentioned later.

When the communication apparatus 20 has not held its own short address ("NO" in S112-5), the control unit 21 sets OFF in the route construction flag of the HELLO frame (S112-7). When the communication apparatus 20 has held its own short address ("YES" in S112-5), the control unit 21 decides whether or not some route construction flags are ON in the LD in the routing table for the target GD (S112-6).

When all of the route construction flags of the LD are OFF in the routing table for the target GD ("NO" in S112-6), the control unit 21 sets OFF in the route construction flag of the HELLO frame (S112-7).

When some of the route construction flags of the LD are ON in the routing table for the target GD ("YES" in S112-6), the control unit 21 sets ON in the route construction flag of the HELLO frame (S112-8).

Loop processing of S112-5 to S112-8 is repeated for the number of times of the number of entries of the GD of the routing table.

The control unit 21 performs a broadcast transmission of the generated HELLO frame to all of the adjacent nodes (S112-11). Please note that "broadcast" here means "broadcast to all the adjacent node apparatus and not "flooding to an entire network".

Figure 42:
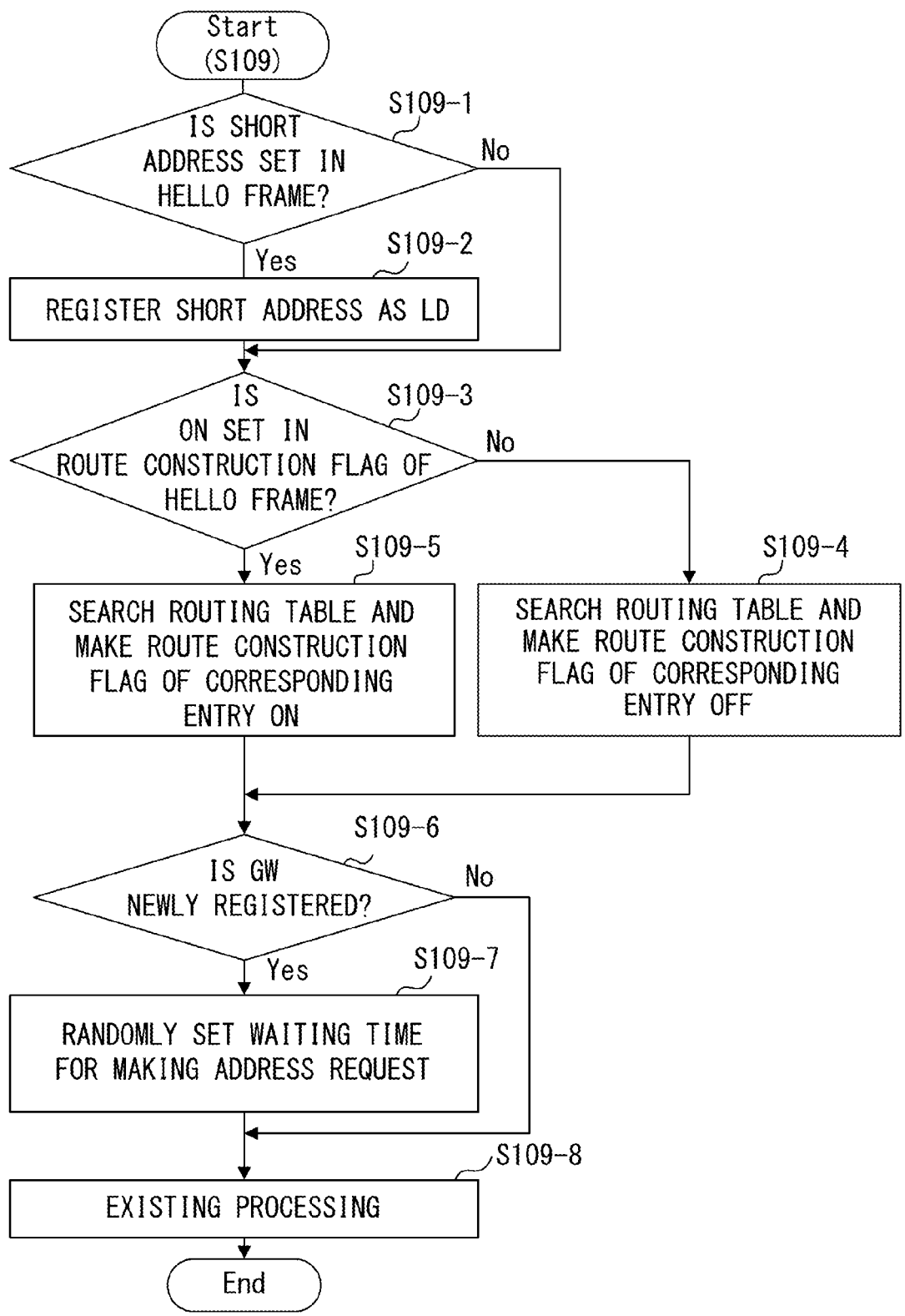
FIG. 42 illustrates a detailed flow of route construction processing (S109) in the present embodiments (Examples 1 to 4).

FIG. 42 illustrates a detailed flow of the route construction processing (S109) in the present embodiments (Examples 1 to 4). The route construction processing (S109) corresponds to route construction processing 25.

The control unit 21 decides whether or not an effective short address is set in the received HELLO frame (S109-1). When the effective short address is set in the received HELLO frame, namely, when a 16-bit address (except 0) is set in the short address field of the HELLO frame, the control unit 21 performs the following processing. Namely, the control unit 21 registers the 16-bit address (the short address) in the routing table 35 in association with the corresponding LDs (S109-2).

The control unit 21 decides whether or not ON is set in the route construction flag of the HELLO frame (S109-3). When OFF is set in the route construction flag of the HELLO frame ("No" in S109-3), the control unit 21 searches the routing table 35 in which the LS of the received HELLO frame is defined as the LD. The control unit 21 turns the route construction flag of the LD of the entry OFF in the searched routing table (S109-4).

When ON is set in the route construction flag of the HELLO frame ("Yes" in S109-3), the control unit 21 searches the routing table 35 in which the LS of the received HELLO frame is defined as the LD. The control unit 21 sets the route construction flag of the LD of the corresponding entry in the searched routing table to ON (S109-5).

The control unit 21 decides whether or not the GW has been newly registered (S109-6). When the GW has been newly registered ("YES" in S109-6), the control unit 21 randomly sets a waiting time until it makes an address request (S109-7).

After that, the control unit 21 performs normal routing processing, GW detection report processing to the application, normal reception processing of the HELLO frame, and the like (S109-8). For example, the control unit 21 calculates the communication quality for each of the routes on the basis of information that was set in the HELLO frame and constructs a plurality of routes to the final destination on the basis of the calculation result. At this time, the control unit 21 newly prepares, updates, or deletes a link table, and newly prepares, updates, or deletes a routing table.

FIG. 43 illustrates a detailed flow of the routing processing (S110) in the present embodiments (Examples 1 to 4). The routing processing (S110) corresponds to routing processing 26.

The control unit 21 refers to the transmission destination (GD) of the received frame and decides whether or not the received frame is the frame addressed to the target apparatus owning the control unit 21 (S110-1). When the received frame is the frame addressed to the target apparatus ("Yes" in S110-1), the control unit 21 reports to the higher rank application that the data frame has been received (S110-6).

When the received frame is not the frame addressed to the target apparatus owning the control unit 21 ("No" in S110-1), the control unit 21 searches the routing table by using the transmission destination (GD) of the received frame (S110-2).

The control unit 21 refers to header information of the received frame and decides a type of the received frame (S110-3). When the type of the received frame is the address request/response frame, the control unit 21 selects the transfer destination from the LDs that correspond to the GDs that were searched for in S110-2 (for example, the LD1 is selected as a transfer destination). The control unit 21 transmits the address request/response frame to the transfer destination (S110-4).

When a type of the received frame is the data frame, the control unit 21 selects as a transfer destination some LDs in which the route construction flag is set as ON from among the LDs that correspond to the GDs that were searched for in S110-2. The control unit 21 acquires from the routing table the short address (the 16-bit address) of the selected transfer destination (the LD). In addition, the control unit 21 acquires from the storage unit 34 its own short address (the 16-bit address). The control unit 21 replaces the LD of the received data frame with the short address (the 16-bit address) of the selected transfer destination (the LD). Further, the control unit 21 replaces the LS of the received data frame with its own short address (the 16-bit address). The control unit 21 replaces the LD with the short address of the selected transfer destination (the LD) and transmits the data frame in which the LS is replaced by its own short address (S110-5).

When the control unit 21 was not able to replace the LD with the short address of the selected transfer destination (the LD) and transmit the data frame in which the LS is replaced by its own short address, the control unit 21 performs the following processing. Namely, the control unit 21 selects as a transfer destination a next candidate (the LD) in which the route construction flag is set as ON from among the LDs that correspond to the GDs that were searched for in S110-2. The control unit 21 replaces the LD with the short address of the selected transfer destination (LD) and transmits the data frame in which the LS has been replaced by its own short address.

Further, when there is no LD in which the route construction flag is set as ON from among the LDs that correspond to the GDs searched for in S110-2, the control unit 21 transmits the data frame to the transmission source (GS) of the received data frame. The node apparatus of the transmission source (GS) transmits the data frame to another GW that is registered beforehand.

FIG. 44 illustrates a detailed flow of address request/response reception processing (S111) in the present embodiments (Examples 1 to 4). The address request/response reception processing (S111) corresponds to address request/response reception processing 27.

The control unit 21 refers to the transmission destination of the received frame (GD) and decides whether or not the received frame is the frame addressed to the target apparatus owning the control unit 21 (S111-1). When the received frame is not the frame addressed to the target apparatus ("NO" in S111-1), the control unit 21 performs routing processing (S110).

When the received frame is the frame addressed to the target apparatus ("YES" in S111-1), the control unit 21 refers to header information of the received frame and decides a type of the received frame (S111-2). When the received frame is the address request frame and the target apparatus owning the control unit 21 is the GW ("YES" in S111-3), the control unit 21 acquires from the received address request frame a transmission source (GS) of the frame. The control unit 21 generates the short address that corresponds to the acquired transmission source (GS) (16 bits) and that is unique in the ad hoc network. The control unit 21 generates the address response frame, sets the generated short address in the address response frame (S111-7), and performs routing processing (S110).

When the received frame is the address request frame and the target apparatus owning the control unit 21 is not the GW ("NO" in S111-3), the control unit 21 discards the received address response frame (S111-5).

When the received frame is the address response frame and the target apparatus owning the control unit 21 is the node ("YES" in S111-4), the control unit 21 performs the following processing. Namely, the control unit 21 acquires the short address (the 16-bit address) set in the address response frame and stores it in the storage unit 34 (S111-6). When the received frame is the address response frame and the target apparatus owning the control unit 21 is not the node ("NO" in S111-4), the control unit 21 discards the received address response frame (S111-5).

As mentioned above, in the present embodiment, the communication apparatus 20 manages the acquirement state of its own short address and the route construction state using the short address to the final destination inside the communication apparatus 20. Further, the communication apparatus 20 may report to the peripheral apparatus whether or not the communication apparatus 20 holds the short address and whether or not the route construction using the short address has been completed, using the route construction flag newly provided in the HELLO frame to be transmitted.

The communication apparatus 20, when receiving the HELLO frame in which the route construction flag is ON, sets the flag of the target LD of the route construction flag that is newly provided for each of the LDs of the routing table as ON. The communication apparatus 20 reports to the application 28 that the GW has been detected, when some of the route construction flags of the LD1 to LD3 to the final destination (the GW) are ON and when it holds its own short address. The communication apparatus 20 further propagates to the peripheral apparatus that the route construction using the short address has been completed by transmitting the route construction flag in the ON state from the subsequent HELLO.

An example of the present embodiments is applied to the ad hoc network using the proactive type routing protocol. At this time, the terminal (the node) that constitutes the ad hoc network may be a terminal with a fixed location or a terminal in which the location frequently moves such as a mobile phone, a PDA (a Personal Digital Assistant) or a laptop personal computer (a PC).

In the network mentioned above, when applying the present embodiments to a standard with a small MTU such as a micro-sized radio, by reducing address information of header information of the data frame and by extending the data payload, a wireless resource may be utilized effectively. The node detects the GW by receiving the HELLO frame and transmits the address request to the GW. The GW, upon receipt of the address request, allocates the short address to each of the nodes. The communication apparatus that has received the HELLO frame in which ON is set in the route construction flag updates the flag of the target LD of the route construction flag provided for each LD of the routing table to ON. The communication apparatus reports to the peripheral apparatus the HELLO frame in which ON is set in the route construction flag when the communication apparatus holds the short address and completes the route construction using the short address. In the communication apparatus, the data communication using the short address becomes available when some of the route construction flags of the LD to the final destination (GW) are ON, and after it holds its own short address.

According to an aspect of the present embodiments, a transmission and reception of data may be performed by constructing an effective route in transmitting the data by using a data frame that uses an address with a specified size.

The present embodiments provided herein are not limited to examples described so far above, and various configurations or embodiments may be employed without departing from the spirit and scope of the present embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A node apparatus that is a first node apparatus configured to construct a wireless communication network by wirelessly communicating with other node apparatuses adjacent to the node apparatus, the node apparatus comprising:
a memory configured to store construction completion decision information on a second node apparatus acquired from the second node apparatus that is adjacent to the first node apparatus, the construction completion decision information indicating whether or not a route between a target transmission destination and the second node apparatus has been constructed using an address with a specified size that specifies a node apparatus in the wireless communication network;
a controller configured to perform processes including:
  acquiring a first address that is an address with the specified size that specifies the first node apparatus; and
  transmitting to one or more adjacent node apparatuses the construction completion decision information on the first node apparatus indicating that the route between the target transmission destination and the first node apparatus has been constructed using an address with a specified size, when the construction completion decision information on the second node apparatus has indicated that the route between the target transmission destination and the second node apparatus has been constructed using the address with the specified size and when the first address has been acquired; and
a transmission unit configured to transmit a data frame by using the first address, when the construction completion decision information on the first node apparatus is transmitted.

2. The node apparatus according to claim 1, wherein
the controller performs processes further includes acquiring from the second node apparatus a second address that is an address with the specified size that specifies the second node apparatus, and
the transmission unit sets the first address and the second address, respectively, in a transmission source field and a transmission destination field that are used for transmitting the data frame, the transmission source field and the transmission destination field being included in a header of the data frame to a subsequent transmission destination.

3. The node apparatus according to claim 2, wherein
the transmission unit, by referring to the memory, selects a second node apparatus from among the second node apparatuses in which a route using the address with the specified size with the target transmission destination has been constructed and transmits the data frame to the selected second node apparatus, by using the first address and the second address.

4. A non-transitory computer-readable recording medium having stored therein a program for causing a computer to execute processing, the computer being a first node apparatus that establishes a wireless communication network through wireless communication with an adjacent node apparatus, the process comprising:
storing in a memory construction completion decision information on a second node apparatus acquired from the second node apparatus that is adjacent to the first node apparatus, the construction completion decision information indicating whether or not a route between a target transmission destination and the second node apparatus has been constructed using an address with a specified size that specifies a node apparatus in the wireless communication network;
acquiring a first address that is an address with the specified size that specifies the first node apparatus;
transmitting to one or more adjacent node apparatuses the construction completion decision information on the first node apparatus indicating that the route between the target transmission destination and the first node apparatus has been constructed using an address with a specified size, when the construction completion decision information on the second node apparatus has indicated that the route between the target transmission destination and the second node apparatus has been constructed using the address with the specified size and when the first address has been acquired; and transmitting a data frame by using the first address, when the construction completion decision information on the first node apparatus is transmitted.

5. The non-transitory computer-readable recording medium according to claim 4, the processing further comprising:

acquiring from the second node apparatus a second address that is an address with the specified size that specifies the second node apparatus, wherein the transmitting a data frame sets the first address and the second address, respectively, in a transmission source field and a transmission destination field that are used for transmitting the data frame, the transmission source field and the transmission destination field being included in a header of the data frame to a subsequent transmission destination.

6. The non-transitory computer-readable recording medium according to claim 5, wherein the transmitting a data frame selects a second node apparatus from among the second node apparatuses in which a route using the address with the specified size with the target transmission destination has been constructed by referring to the storage unit, and transmits the data frame to the selected second node apparatus, by using the first address and the second address.

7. A wireless communication system comprising:

a plurality of node apparatuses that construct a wireless communication network by wirelessly communicating with an adjacent node apparatus; and a server that transmits an address of a specified size specifying each of the plurality of node apparatuses to each of the plurality of node apparatuses, wherein a first node apparatus that is each of the plurality of node apparatuses includes:

a memory configured to store construction completion decision information on a second node apparatus acquired from the second node apparatus that is adjacent to the first node apparatus, the construction completion decision information indicating whether or not a route between a target transmission destination and the second node apparatus has been constructed using an address with a specified size that specifies a node apparatus in the wireless communication network;

a controller configured to perform processes including:

acquiring a first address that is an address with the specified size that specifies the first node apparatus; and transmitting to one or more adjacent node apparatuses the construction completion decision information on the first node apparatus indicating that the route between the target transmission destination and the first node apparatus has been constructed using an address with a specified size, when the construction completion decision information on the second node apparatus has indicated that the route between the target transmission destination and the second node apparatus has been constructed using the address with the specified size and when the first address has been acquired; and a transmission unit configured to transmit a data frame by using the first address, when the construction completion decision information on the first node apparatus is transmitted.

8. The wireless communication system according to claim 7, wherein the controller performs processes further includes acquiring from the second node apparatus a second address that is an address with the specified size that specifies the second node apparatus, and the transmission unit sets the first address and the second address, respectively, in a transmission source field and a transmission destination field that are used for transmitting the data frame, the transmission source field and the transmission destination field being included in a header of the data frame to a subsequent transmission destination.

9. The wireless communication system according to claim 8, wherein the transmission unit, by referring to the memory, selects a second node apparatus from among the second node apparatuses in which a route using the address with the specified size with the target transmission destination has been constructed and transmits the data frame to the selected second node apparatus, by using the first address and the second address.

10. A method for data communication executed by a first node apparatus that constructs a wireless communication network by wirelessly communicating with an adjacent node apparatus, the method comprising:

storing in a memory construction completion decision information on a second node apparatus acquired from the second node apparatus that is adjacent to the first node apparatus, the construction completion decision information indicating whether or not a route between a target transmission destination and the second node apparatus has been constructed using an address with a specified size that specifies a node apparatus in the wireless communication network;

acquiring a first address that is an address with the specified size that specifies the first node apparatus;

transmitting to one or more adjacent node apparatuses the construction completion decision information on the first node apparatus indicating that the route between the target transmission destination and the first node apparatus has been constructed using an address with a specified size, when the construction completion decision information on the second node apparatus has indicated that the route between the target transmission destination and the second node apparatus has been constructed using the address with the specified size and when the first address has been acquired; and transmitting a data frame by using the first address, when the construction completion decision information on the first node apparatus is transmitted.

11. The method for data communication according to claim 10, the method further comprising:

acquiring from the second node apparatus a second address that is an address with the specified size that specifies the second node apparatus, wherein the transmission a data frame sets the first address and the second address, respectively, in a transmission source field and a transmission destination field that are used for transmitting the data frame, the transmission source field and the transmission destination field being included in a header of the data frame to a subsequent transmission destination.

12. The method for data communication according to claim 11, wherein
the transmitting the data frame selects a second node apparatus from among the second node apparatuses in which a route using the address with the specified size with the target transmission destination has been constructed by referring to the memory, and transmits the data frame to the selected second node apparatus, by using the first address and the second address.

* * * * *